US009215587B2

(12) United States Patent
Moradi et al.

(10) Patent No.: US 9,215,587 B2
(45) Date of Patent: Dec. 15, 2015

(54) METHODS AND APPARATUSES FOR SELF-GENERATING FAULT-TOLERANT KEYS IN SPREAD-SPECTRUM SYSTEMS

(71) Applicant: Battelle Energy Alliance, LLC, Idaho Falls, ID (US)

(72) Inventors: Hussein Moradi, Idaho Falls, ID (US); Behrouz Farhang, Salt Lake City, UT (US); Vijayarangam Subramanian, Naperville, IL (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 57 days.

(21) Appl. No.: 14/163,723

(22) Filed: Jan. 24, 2014

(65) Prior Publication Data
US 2015/0215776 A1 Jul. 30, 2015

(51) Int. Cl.
*H04B 1/00* (2006.01)
*H04W 12/04* (2009.01)
(Continued)

(52) U.S. Cl.
CPC ............. *H04W 12/04* (2013.01); *H04B 1/707* (2013.01); *H04B 1/709* (2013.01); *H04B 1/7093* (2013.01);
(Continued)

(58) Field of Classification Search
CPC ..... H04W 12/06; H04W 12/04; H04W 16/14; H04W 12/12; H04L 63/0428; H04L 2463/101; H04L 2463/103; H04L 63/0442; H04L 2001/0098; H04L 45/28; H04L 63/045; H04L 9/006; H04L 9/0861; H04L 20/57; H04L 61/04; H04L 2209/80
USPC ......... 455/410, 63.1, 454; 375/140, 142, 146, 375/141, 133, 132, 135, 136, 147; 380/44, 380/270; 726/2
See application file for complete search history.

(56) References Cited

U.S. PATENT DOCUMENTS 3,849,730 A 11/1974 Ho
5,204,901 A 4/1993 Hershey et al.
(Continued)

FOREIGN PATENT DOCUMENTS

CN 1503463 A 6/2004

OTHER PUBLICATIONS

Farhang-Boroujeny, "OFDM Versus Filter Bank Multicarrier," IEEE Signal Processing Magazine, vol. 28, No. 3, May 1, 2011, pp. 92-112.
(Continued)

*Primary Examiner* — Rahel Guarino
(74) *Attorney, Agent, or Firm* — TraskBritt

(57) ABSTRACT

Self-generating fault-tolerant keys for use in spread-spectrum systems are disclosed. At a communication device, beacon signals are received from another communication device and impulse responses are determined from the beacon signals. The impulse responses are circularly shifted to place a largest sample at a predefined position. The impulse responses are converted to a set of frequency responses in a frequency domain. The frequency responses are shuffled with a predetermined shuffle scheme to develop a set of shuffled frequency responses. A set of phase differences is determined as a difference between an angle of the frequency response and an angle of the shuffled frequency response at each element of the corresponding sets. Each phase difference is quantized to develop a set of secret-key quantized phases and a set of spreading codes is developed wherein each spreading code includes a corresponding phase of the set of secret-key quantized phases.

32 Claims, 12 Drawing Sheets

(51) Int. Cl.
  H04B 1/709    (2011.01)
  H04B 1/707    (2011.01)
  H04B 1/7093   (2011.01)
  H04L 27/26    (2006.01)
  H04L 1/04     (2006.01)
  H04L 9/08     (2006.01)
  H04B 1/69     (2011.01)

(52) U.S. Cl.
  CPC ............... *H04L 1/04* (2013.01); *H04L 9/0816* (2013.01); *H04L 27/264* (2013.01); *H04B 1/69* (2013.01); *H04L 2209/24* (2013.01); *H04L 2209/80* (2013.01)

(56) References Cited

U.S. PATENT DOCUMENTS

| | | | |
|---|---|---|---|
| 6,154,484 | A | 11/2000 | Lee et al. |
| 6,272,121 | B1 | 8/2001 | Smith et al. |
| 6,553,396 | B1 | 4/2003 | Fukuhara et al. |
| 6,741,551 | B1 | 5/2004 | Cherubini |
| 7,180,963 | B2 | 2/2007 | Wang et al. |
| 7,394,844 | B1 | 7/2008 | Orr |
| 7,443,917 | B2 | 10/2008 | Vitenberg |
| 7,558,310 | B1 | 7/2009 | Von der Embse |
| 7,609,611 | B1 | 10/2009 | Siohan et al. |
| 7,634,030 | B2 | 12/2009 | Kim et al. |
| 7,787,545 | B2 | 8/2010 | Orr et al. |
| 7,898,936 | B2 | 3/2011 | Al Adnani |
| 2002/0034160 | A1 | 3/2002 | Marchok et al. |
| 2003/0072382 | A1 | 4/2003 | Raleigh et al. |
| 2004/0047430 | A1 | 3/2004 | McCarty, Jr. |
| 2004/0101068 | A1 | 5/2004 | Wang et al. |
| 2004/0213351 | A1 | 10/2004 | Shattil |
| 2005/0047513 | A1 | 3/2005 | Vitenberg |
| 2005/0154925 | A1* | 7/2005 | Chitrapu ............... H04L 9/3234 726/19 |
| 2005/0245268 | A1 | 11/2005 | Green et al. |
| 2008/0130802 | A1 | 6/2008 | Conroy et al. |
| 2008/0226003 | A1 | 9/2008 | Chevalier et al. |
| 2008/0316912 | A1 | 12/2008 | Al Adnani |
| 2009/0316568 | A1 | 12/2009 | Harris et al. |
| 2010/0246375 | A1 | 9/2010 | Orlik et al. |
| 2011/0002232 | A1 | 1/2011 | Niewczas et al. |
| 2011/0188671 | A1 | 8/2011 | Anderson et al. |
| 2012/0002703 | A1 | 1/2012 | Yamashita et al. |
| 2013/0142218 | A1 | 6/2013 | Moradi et al. |

OTHER PUBLICATIONS

Wasden et al., "Design and Implementation of a Multicarrier Spread Spectrum Communication System," Military Communication Conference, IEEE, Oct. 29, 2012, pp. 1-7.
Office Action with Search Report for Chinese Application No. 201280068999.2, issued Apr. 24, 2015, 24 pages.
Ahlswede et al., "Common randomness in information theory and cryptography—Part I: secret sharing," IEEE Trans. Inf. Theory, vol. 39, No. 4, Jul. 1993, pp. 1121-1132.
Aono et al., "Wireless secret key generation exploiting reactance-domain scalar response of multipath fading channels," IEEE Trans. Antennas & Propagation, vol. 53, no. 11, pp. 3776-3784, Nov. 2005.
Azimi-Sadjadi et al., "Robust key generation from signal envelopes in wireless networks," Proc. 14th ACM Conf. Computer and Comm. Security (CCS '07), pp. 401-410, Nov. 2007.
Cheun et al., "Antijamming performance of a multicarrier direct-sequence spread-spectrum system," IEEE Transactions on Communications, vol. 47, No. 12, pp. 1781-1784, Dec. 1999.
Dodis et al., "Fuzzy Extractors: How to Generate Strong Keys from Biometrics and Other Noisy Data. In Advances in Cryptology •U EUROCRYPT 2004," Jan. 20, 20008, pp. 1-46.
Farhang-Boroujeny, B., "Square-root Nyquist (M) filter design for digital communication systems," IEEE Trans. on Signal Processing, vol. 56, No. 5, May 2008, pp. 2127-2132.
Hara et al., "Overview of multicarrier cdma," IEEE Communications Magazine, vol. 35, pp. 126-133, 1997.
Hassan et al., "Cryptographic key agreement for mobile radio," Elsevier Digital Signal Processing, vol. 6, 1996, pp. 207-212.
Hershey et al., "Unconventional cryptographic keying variable management," IEEE Trans. Commun., vol. 43, No. 1, Jan. 1995, pp. 3-6.
Jana et al., "On fast and accurate detection of unauthorized access points using clock skews," Proc. ACM MobiCom, Sep. 2008.
Kaleh, G.K., "Frequency-diversity spread-spectrum communication system to counter bandlimited gaussian interference," IEEE Transactions on Communications, vol. 44, No. 7, pp. 886-893, 1996.
Kondo et al., "Performance of multicarrier DS CDMA Systems," IEEE Transactions on Communications, vol. 44, pp. 238-246, 1996.
Li et al., "Securing wireless systems via lower layer enforcements," Proc. Fifth ACM Work-shop Wireless Security (WiSe '06), pp. 33-42, Sep. 2006.
Madiseh et al., "Secret key extraction in ultra wideband channels for unsynchronized radios," Proc. Sixth Ann. Conf. Comm. Networks and Services Research (CNSR '08), May 2008.
Mathur et al., "Radio-telepathy: extracting a secret key from an unauthenticated wireless channel," Proc. ACM MobiCom, Sep. 2008.
Maurer et al., "Unconditionally secure key agreement and the intrinsic conditional information," IEEE Trans. Information Theory, vol. 45, No. 2, pp. 499-514, Mar. 1999.
Maurer, U.M., "Secret Key Agreement by Public Discussion from Common Information," IEEE Trans. Inf. Theory, vol. 39, No. 3, May 1993, pp. 733-742.
Merkle, R.C., "Secure communications over insecure channels," Commun. ACM, vol. 21, No. 4, 1978, pp. 294-299.
Nigam et al., "Finite Duration Root Nyquist Pulses with Maximum In-Band Fractional Energy," IEEE Communications Letters, vol. 14, No. 9, Sep. 2010, pp. 797-799.
Patwari et al., "High rate uncorrelated bit extraction for shared secret key generation from channel measurements," IEEE Trans. Mobile Computing, vol. 9, No. 1, Jan. 2010, pp. 17-30.
PCT International Search Report and Written Opinion of the International Searching Authority for PCT/US2012/049372, dated Oct. 19, 2012, 13 pages.
Sayeed et al., "Secure wireless communications: secret keys through multipath," Proc. IEEE Int'l Conf. Acoustic, Speech and Signal Processing (ICASSP '08), pp. 3013-3016, Apr. 2008.
Tope et al., "Unconditionally secure communications over fading channels," Proc. Military Comm. Conf. (MILCOM '01), vol. 1, pp. 54-58, Oct. 2001.
Wilson et al., "Channel identification: secret sharing using reciprocity in UWB channels," IEEE Trans. Information Forensics and Security, vol. 2, No. 3, pp. 364-375, Sep. 2007.
Ye et al., "Extracting secrecy from jointly Gaussian random variables," Proc. 2006 IEEE Int'l Symp. Information Theory (ISIT '06), pp. 2593-2597, Jul. 2006.
Ye et al., "On the Secrecy Capabilities of ITU Channels," Proc. IEEE Vehicular Technology Conf. (VTC '07-Fall), pp. 2030-2034, Oct. 2007.

* cited by examiner

METHODS AND APPARATUSES FOR SELF-GENERATING FAULT-TOLERANT KEYS IN SPREAD-SPECTRUM SYSTEMS

GOVERNMENT RIGHTS

This invention was made with government support under Contract Number DE-AC07-05ID14517 awarded by the United States Department of Energy. The government has certain rights in the invention.

CROSS-REFERENCE TO RELATED APPLICATION

This application is related to U.S. patent application Ser. No. 13/311,357, filed Dec. 5, 2011, now U.S. Pat. No. 8,731,027, issued May 20, 2014, the entire disclosure of which is incorporated herein by this reference.

FIELD

Embodiments of the present disclosure are directed to the field of wireless transmission of signals and, more particularly, to secure wireless transmission of spread-spectrum signals.

BACKGROUND

There is a trend in multi-carrier mobile communication consumer equipment towards the provision of multimode wireless services using various standards, which are continuously being updated. As the demand for personalized applications suited to diverse needs continues to grow, there is an increasing need for multimode terminals that can provide seamless connectivity between different multi-carrier modes and that can be upgraded according to user needs.

A spread-spectrum (SS) technique is often used to distribute wireless transmit signals over a wider bandwidth than the minimum required transmission bandwidth. In military applications, SS transmission may be used to avoid jamming and also to reduce the probability of detection or interception. In civilian applications, some forms of SS, such as code-division multiple access (CDMA) may be used to allow multiple users to share the same channel or spectrum. Common techniques being used are direct-sequence spread spectrum (DSSS) and frequency-hopping spread spectrum (FHSS). These common SS techniques may suffer from susceptibility to narrow and partial band interference. Multi-Carrier Spread Spectrum (MCSS) is a particular form of SS that is designed to be resistant to narrow and/or partial band interference. In one conventional form, Orthogonal Frequency Division Multiplexing (OFDM) techniques have been used for creating this spreading.

The use of wireless channels to generate secret-keys has been proposed before. However, a number of researchers have noted problems in the more general context of information encryption and noted that some on-the-fly strategies have to be adopted for achieving a higher degree of security. As a result, many proposals have reported various strategies for key agreement between communicating parties over publicly available spectra. One of the earliest works is a so-called "puzzle solver system" devised as an intelligent strategy (puzzle system) where the two communicating parties pass messages that will enable them to jointly solve a puzzle whose solution is a common key of length N. They solve the puzzle with a complexity that is on the order of N. An adversary who may have access to the communicated messages can also solve the puzzle, albeit with a complexity of order $N^2$ or higher. Assuming that N is a large number, the latter complexity may be prohibitively large and thus significantly reduces the chance of the adversary finding the key.

Later studies proposed the possibility of using some random information that may be available to a pair of communicating parties for generating a secret-key. However, some of these proposals discovered some fundamental bounds on the rate of generation of keys when a pair of communicating parties has access to the correlated random variables due to some external source. The most natural "external source" is some characteristics of the channel response, in the time domain or frequency domain due to the reciprocity property of the propagation channel between the communicating parties. The reciprocity property states that when device A and device B are communicating, at a given time, the channel response from device A to device B is the same as the channel response from device B to device A.

Using this reciprocity property, some proposals suggested a simple and practical method of deploying the channel reciprocity in selecting secret-keys. It has been proposed that one might transmit a set of tones from device A to device B and later (but within an interval that one may assume the reciprocity holds) the same set of tones is transmitted from device B to device A. The phase difference between the tones are measured at both device A and device B and based on the measured results a key is selected. An eavesdropper at another location with device C will see different channel responses (from device A to device C and device B to device C) than the one that connects device A and device B. However, due to the channel noise, differences in measurements are likely. To resolve this problem, multiple measurements should be performed and some exchange of information between A and B is needed to minimize the probability of any mismatch of the generated keys at device A and device B.

Using channel responses and channel reciprocity, a variety of measurement techniques and characteristics of the propagation channel have been proposed to devise mechanisms for key generation. However, these proposals assume that a long key of length N is generated and the transmit data is encoded using this key. For example, the encoding is performed by an operating Boolean Exclusive OR (XOR) function on the blocks of size N data bits and the secret-key. Hence, any mismatch between the secret-keys at A and B will result in errors in detected data at both sides.

There is a need for apparatuses and methods that determine channel responses and use that channel response in a new way to develop secret keys that are self-generated at two different devices and provide fault-tolerant encryption of communication between the two devices.

SUMMARY

Embodiments of the present disclosure include apparatuses and methods for self-generating secret-keys that can augment security performance and provide fault tolerance for spread spectrum communication systems.

Embodiments of the present disclosure include a method of self-generation of a fault-tolerant encryption key on a communication device. The method includes detecting a plurality of beacon signals at a plurality of frequencies received from an additional communication device and determining a set of impulse responses from the plurality of beacon signals. The set of impulse responses are circularly shifted to place a largest sample at a predefined position in the set of impulse responses. The set of impulse responses are converted to a set of frequency responses in a frequency domain. The set of frequency responses are shuffled with a predetermined shuffle scheme to develop a set of shuffled frequency responses. A set of phase differences is determined as a difference between an angle of the frequency response and an angle of the shuffled frequency response at each element of the corresponding sets. Each phase difference of the set is quantized to develop a set of secret-key quantized phases and a set of spreading codes is developed wherein each spreading code of the set includes a corresponding phase of the set of secret-key quantized phases.

Embodiments of the present disclosure include a method of self-generating a fault-tolerant encryption key separately on each of a first communication device and a second communication device. On the first communication device, a plurality of beacon signals is transmitted at a plurality of frequencies on a communication channel and a set of impulse responses is determined responsive to the plurality of beacon signals received from the second communication device. On the second communication device, transmitting the plurality of beacon signals is transmitted at the plurality of frequencies on the communication channel and a set of impulse responses is determined responsive to the plurality of beacon signals received from the first communication device. On each of the first communication device and the second communication device, the set of impulse responses for that device is circularly shifted to place a largest sample at a predefined position in the set of impulse responses and the set of impulse responses is converted to a set of frequency responses in a frequency domain. Also on each of the first communication device and the second communication device, the set of frequency responses is shuffled with a predetermined shuffle scheme to develop a set of shuffled frequency responses and a set of phase differences is determined as a difference between an angle of the frequency response and an angle of the shuffled frequency response at each element of the corresponding sets. Also on each of the first communication device and the second communication device, each phase difference of the set is quantized to develop a set of secret-key quantized phases and a set of spreading codes is developed wherein each spreading code of the set includes a corresponding phase of the set of secret-key quantized phases.

Embodiments of the present disclosure include a communication device for communicating on a spread-spectrum. The communication device includes a receiver comprising circuitry for demodulating a plurality of beacon signals at a plurality of frequencies received from an additional communication device. A channel estimator includes circuitry for determining a set of impulse responses from the received plurality of beacon signals. A key generator includes circuitry for time-aligning the set of impulse responses to place a largest sample at a predefined position in the set of impulse responses and converting the set of impulse responses to a set of frequency responses in a frequency domain. The key generator also includes circuitry for developing a set of shuffled frequency responses by shuffling the set of frequency responses with a predetermined shuffle scheme and determining a set of phase differences, each phase difference of the set comprising a difference between an angle of the frequency response and an angle of the shuffled frequency response at each element of the corresponding sets. The key generator also includes circuitry for quantizing each phase difference of the set to develop a set of secret-key quantized phases and developing a set of spreading codes wherein each spreading code of the set includes a corresponding phase of the set of secret-key quantized phases.

DETAILED DESCRIPTION

Figure 1A:
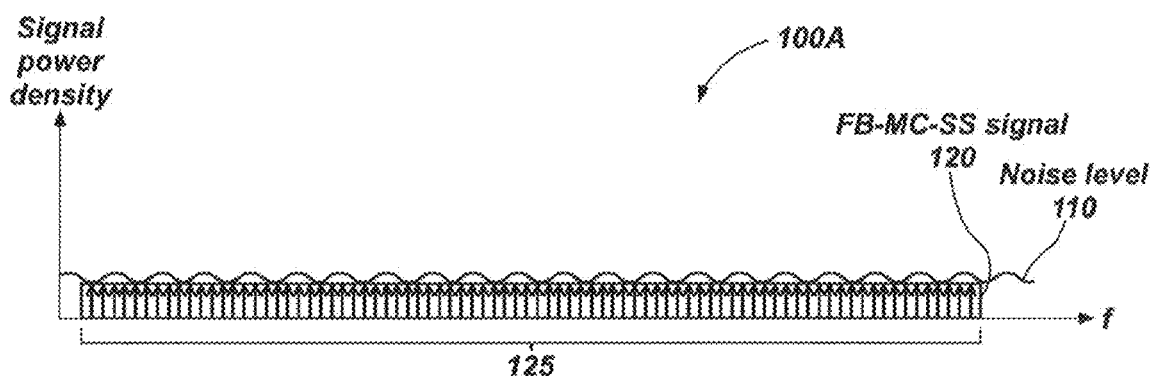
FIG. 1A shows a Filter-Bank Multi-Carrier Spread-Spectrum (FB-MC-SS) signal over a frequency spectrum and with a power level at or below a noise level.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention.

Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Headings are included herein to aid in locating certain sections of detailed description. These headings should not be considered to limit the scope of the concepts described under any specific heading. Furthermore, concepts described in any specific heading are generally applicable in other sections throughout the entire specification.

Embodiments of the present disclosure may be used in a variety of spread-spectrum systems. As non-limiting examples, direct sequence spread spectrum (DSSS) systems, Code Division Multiple Access (CDMA) systems, and Filter-Bank Multi-Carrier Spread-Spectrum (FB-MC-SS) systems may be configured to use embodiments of the present disclosure.

A FB-MC-SS system is fully disclosed in U.S. patent application Ser. No. 13/311,357, filed Dec. 5, 2011, now U.S. Pat. No. 8,731,027, issued May 20, 2014, the entire disclosure of which has been incorporated herein by a prior reference thereto. Substantial detail of an FB-MC-SS system is provided herein in order to provide background for how some spread-spectrum signals are handled and to later discuss one example of how embodiments of the present disclosure might be applied to an FB-MC-SS system. From this later discussion, a person of ordinary skill in the art will understand how to apply embodiments of the present disclosure to other spread-spectrum systems, such as, for example, DSSS systems and CDMA systems.

1. A Filter-Bank Multi-Carrier Spread-Spectrum

FB-MC-SS systems use a unique implementation for MC-SS signals based on filter banks. Non-overlapping subcarrier filters used in the filter banks are used in transmit and receive systems that generate MC-SS signals that can coexist with other signals within the same spectrum. A Filter-Bank Multi-Carrier Spread-Spectrum (FB-MC-SS) signal may exist in an apparent noise level of other conventional communication signals operating at higher power. In addition, the FB-MC-SS signal may feature multiple redundancies in data symbol transmission. As a result of these characteristics, the FB-MC-SS may have a low probability of detection and interception, and may be able to operate under harsh RF environments and/or jamming conditions. FB-MC-SS signals pose little or no taxation on the spectrum under use because FB-MC-SS signals can transmit at or near the noise level of other signals and can be deployed on most any band of frequencies. In addition, FB-MC-SS signals may prove useful in rejecting narrow and partial band interferences as opposed to conventional SS techniques. For example, conventional techniques in which the subcarriers of the SS signal may simply drop communication rather than being able to determine interference and reduce the weight given to those subcarriers.

FIG. 1A shows a graph 100A illustrating an FB-MC-SS signal 120. The x-axis of the graph 100A represents the frequency of the signals over a frequency spectrum 125, and the y-axis of the graph 100A represents the spectral power density of the signals. Line 110 is a threshold that represents the noise level 110 over the frequency spectrum 125. The frequency spectrum 125 may have some desired bandwidth. As a non-limiting example, such a bandwidth may be 50 MHz.

The FB-MC-SS signal 120 has a power level at or below the noise level 110. The noise level 110 is a power level below which other communication signals being transmitted in the frequency spectrum 125 would consider noise that would not have a significant impact on their communication signal. The FB-MC-SS signal 120 may be considered an underlay control channel (i.e., "underlay," meaning it is below the noise level 110) with a relatively large number of subcarriers over the frequency spectrum 125. The subcarriers are illustrated by the arrows pointing up within a relatively small bandwidth illustrated by a box around each arrow. The number of subcarriers is generally selected to be a large number and may also be selected to be a power of two (i.e., $2^n$), such as, for example, 128, 2048, and 4096 subcarriers.

The FB-MC-SS signal 120 includes a data symbol modulated onto each subcarrier. Moreover, the same data symbol is redundantly modulated onto each subcarrier. In other words, each subcarrier of the FB-MC-SS signal 120 includes the same data. As a non-limiting example, the data symbol modulation may be as simple as a single bit modulated with binary phase shift keying (BPSK). In addition, more complex data symbol modulation techniques may be used for data symbols containing more data bits. For example, and without limitation, modulation techniques, such as quadrature phase shift keying (QPSK) and quadrature amplitude modulations (QAM), such as QAM 16, QAM 32, and QAM 64, may be used. Of course, these examples are intended to be non-limiting, and other data symbol modulation techniques are contemplated. Generally, the more simple modulation schemes may allow for easier data symbol recovery and may be more robust in embodiments transmitting at very low power levels.

Figure 1B:
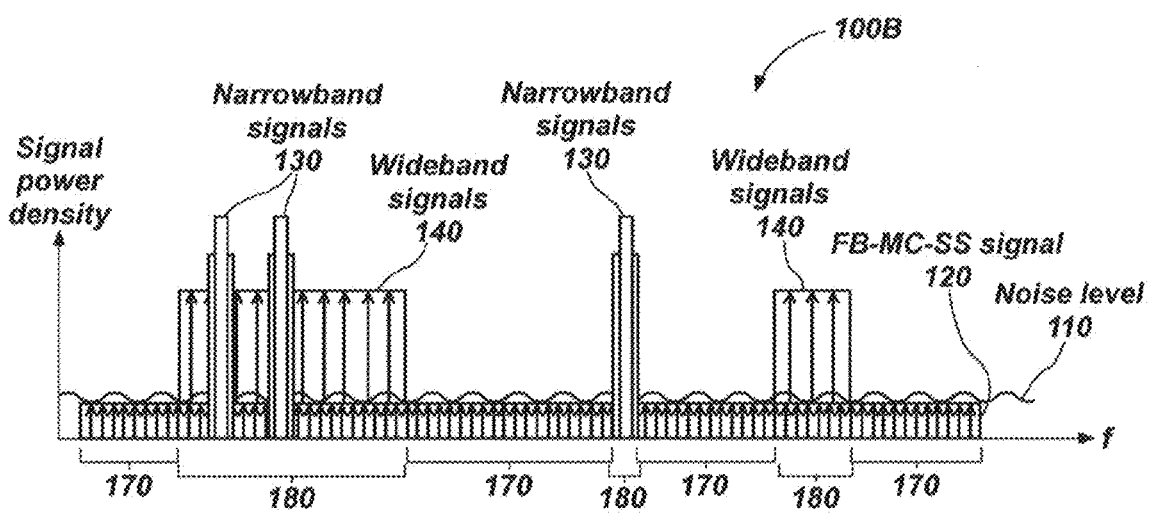
FIG. 1B shows the FB-MC-SS signal over a frequency band with other communication signals in the frequency spectrum.

FIG. 1B is a graph 100B showing the FB-MC-SS signal 120 over a frequency band with other communication signals being transmitted in the frequency spectrum 125 (FIG. 1A). For example, various narrowband signals 130 and wideband signals 140 may be transmitted at various frequency bands within the frequency spectrum. The narrowband signals 130 and wideband signals 140 may collectively be referred to as communications signals 130, 140 herein.

Relative to other types of signals, a narrowband signal 130 tends to be in a relatively narrow frequency band and at a relatively higher power level. For example, depending on the frequencies involved, narrowband signals 130 may include single carrier (i.e., tone) signals or other relatively narrow frequency bands, such as Frequency Modulation (FM) signals, frequency hopping signals, public safety communication channels, and Global System for Mobile telecommunications (GSM) signals.

Wideband signals 140 may be signals that have multiple carriers spread over a relatively wide band, such as, for example, Orthogonal Frequency Division Multiplexing (OFDM) signals. A wideband signal 140 also tends to have a narrow frequency band around each subcarrier, but includes multiple subcarriers, which spreads the signal over a wider frequency band. In general, wideband signals 140 may be at a lower power level than narrowband signals 130. As non-limiting examples, power levels for the FB-MC-SS signal 120 may be in the 1- to 10-milliwatt range, whereas power levels for a wideband signal 140 or a narrowband signal 130 may be in the 10- to 100-milliwatt range.

In addition, in many definitions of spread-spectrum wideband signals, the frequency bands around each subcarrier may overlap by a small amount. In contrast, the FB-MC-SS signal 120 may be configured with narrow bands, such that there is little or no overlap of bands between adjacent subcarriers. In other words, the FB-MC-SS signal 120 spreads the signal over a set of spectrally isolated subcarrier bands.

Figure 1C:
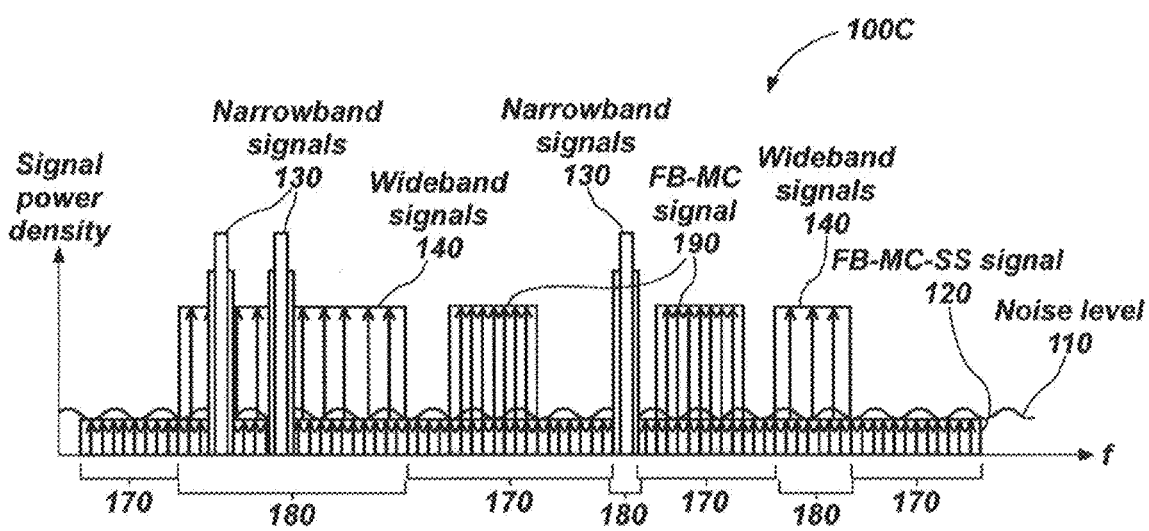
FIG. 1C shows the FB-MC-SS signal and other communication signals with high data rate overlay channels included in white spaces in the frequency spectrum.

The FB-MC-SS signal 120 may coexist with the communication signals 130, 140 because the power level is sufficiently near the noise level 110 such that the communication signals 130, 140 will consider the FB-MC-SS signal 120 to be at an apparent noise level. However, the communication signals 130, 140 may be considered as interference to the FB-MC-SS signal 120. Thus, braces below the graph in FIGS. 1B and 1C show interference bands 180 where there may be other communication signals 130, 140, and other braces show clear bands 170 where no detectable high power signals are located. As discussed more fully below, no weight, or a relatively low weight, may be given to carrier frequencies of the FB-MC-SS signal 120 that are in interference bands 180 and give a relatively high weight to carrier frequencies of the FB-MC-SS signal 120 that are in clear bands 170. In other words, the combined de-modulated FB-MC-SS signal 120 on the receiver side may contain a larger amount of the less noisy signals (i.e., non-interfered subcarriers of the FB-MC-SS signal 120) and a smaller amount of the more noisy signals (i.e., interfered subcarriers of the FB-MC-SS signal 120).

FIG. 1C is a graph 100C showing the FB-MC-SS signal 120 and other communication signals 130, 140 with filter bank multi-carrier (FB-MC) signals 190 included in white spaces in the clear bands 170 of the frequency spectrum 125 (FIG. 1A). While the communication signals 130, 140 may be generated by other operators, the FB-MC signals 190 may be generated by the same operator that generates the FB-MC-SS signal 120. Thus, as discussed above, the FB-MC-SS signal 120 may be considered an underlay channel, whereas the FB-MC signal 190 may be considered an overlay channel (i.e., "overlay," meaning it is above the noise level 110) of the same operator. In addition, the FB-MC signal 190 may not be an SS signal. With the higher power, the FB-MC signals 190 may be configured with more complex data symbols and transmit different data symbols on each subcarrier. As a result, the data transmitted by the operator over the FB-MC signals 190 may have a relatively higher data rate than the FB-MC-SS signal 120. In addition, because of the pulse shaping characteristics described below, the FB-MC signals 190 may be more spectrally isolated. As a result, the FB-MC signals 190 may have subcarriers that are spaced closer together than other wideband signals 140, as indicated by the spacing of the arrows shown in FIG. 1C. As a result, the FB-MC signals 190 may have a relatively higher data rate than the other wideband signals 140 generated by other operators within the frequency spectrum 125.

Embodiments of the present disclosure may use the FB-MC-SS signal 120 to detect these white spaces. Once detected, an adaptive radio scenario may be set up whereby the higher power FB-MC signals 190 may be transmitted over carriers that occupy the white space. In such a scenario, the FB-MC-SS signal 120 may be thought of as an underlay control channel for detecting white spaces and controlling the higher data rate FB-MC signals 190 as the overlay channel. The adaptive radio occupation period for the high data rate overlay channels FB-MC signals 190 may be a relatively short period, such as, for example, 10 milliseconds, which may vary with different protocols defined for dynamic spectrum access of unused frequency spectrums.

Figure 2A:
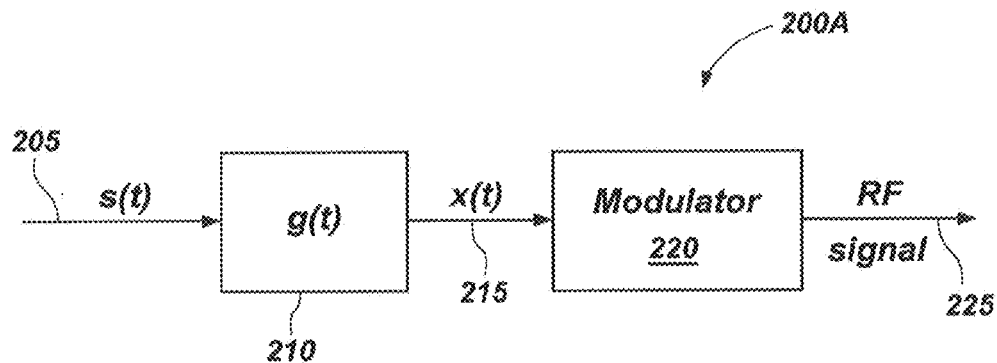
FIGS. 2A and 2B are block diagrams of a transmitter for generating the FB-MC-SS signal as an underlay signal.

FIG. 2A is a block diagram of a transmitter 200A for generating the FB-MC-SS signal 120 as an underlay signal. The transmitter 200A includes a pulse shaping and distribution module 210 and a modulator 220. The pulse shaping and distribution module 210 may be configured to receive input data symbols 205 (i.e., s(t)), and perform a filtering and spectrum distribution function (e.g., an impulse response represented by g(t)) to generate a baseband output signal 215 (i.e., x(t)). The modulator 220 receives the baseband output signal 215 to be modulated and up-converted for RF transmission as RF signal 225 (e.g., FB-MC-SS signal 120 (FIG. 1A)).

In an embodiment for generating a low to medium data-rate FB-MC-SS signal 120 as an underlay control channel, one symbol may be transmitted at a time and that symbol is spread over all the carrier frequencies in the spread-spectrum signal. In other words, at a first symbol time, all subcarriers modulate the same first symbol, and at a second symbol time, all subcarriers modulate the same second symbol, etc. Thus, in one embodiment, each data symbol is a simple binary bit. Other embodiments may, however, include more complex modulation of multiple bits for each data symbol. In addition, when configured to transmit the higher data rate FB-MC signals 190 (FIG. 1C) as overlay channels, different data symbols may be transmitted on different subcarriers. In other words, for the overlay channel, the transmission may not be spread spectrum.

Figure 2B:
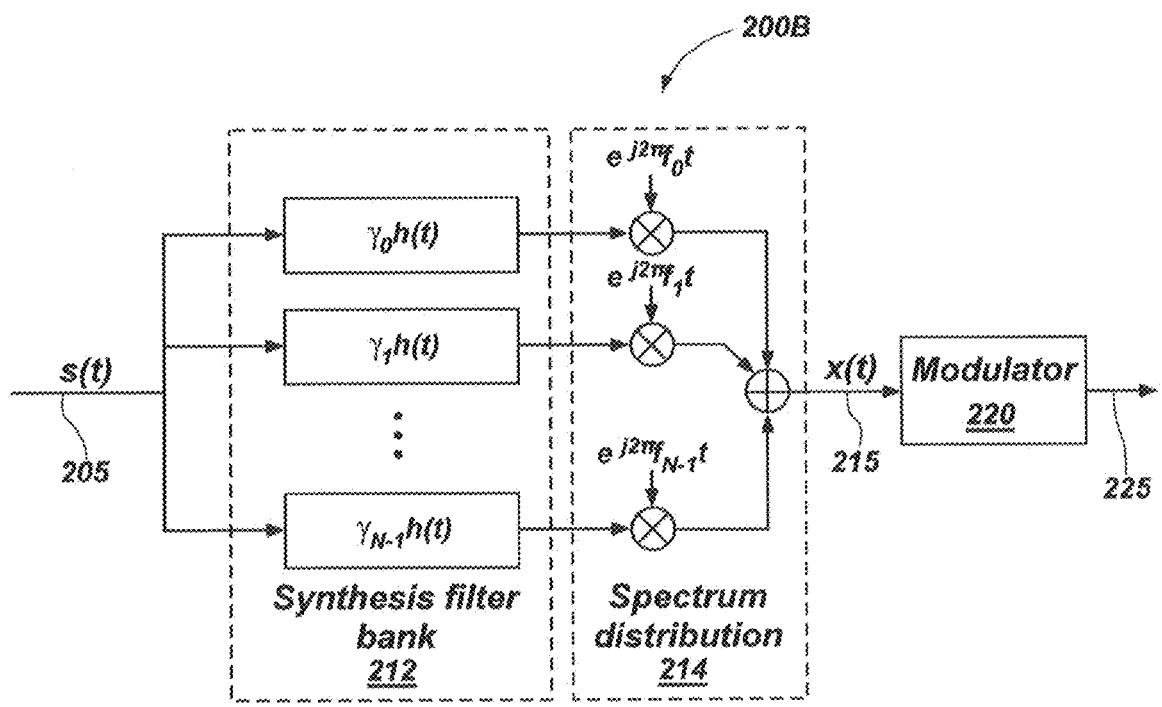

FIG. 2B is a block diagram of a transmitter 200B for generating the FB-MC-SS signal 120 (FIG. 1A) as an underlay signal. In this embodiment, the pulse shaping and distribution module 210 of FIG. 2A is separated into a synthesis filter bank 212 and a spectrum distribution module 214. The transmitter 200B further includes the modulator 220 configured as described above. The synthesis filter bank 212 receives the input data symbols 205, which is the information to be transmitted. The input data symbols 205 are filtered and gain added in the synthesis filter bank 212. The spectrum distribution module 214 is configured to add phase to the input data symbols 205 to generate the baseband output signal 215 that includes the data symbols distributed throughout the plurality of subcarriers of the frequency spectrum.

The pulse-shaping filter g(t) (FIG. 2A) on the transmitter side may be broken down into two separate components, namely a "prototype filter" h(t), and another function of time p(t), thus: g(t)=h(t)p(t). In other words, the input data symbols 205 are passed through the pulse-shaping filter g(t) (characterized by an impulse response represented by g(t)) before being modulated and up-converted for RF transmission.

With the input data symbols 205 defined as a train of data symbols s[n] at a spacing T, the input data symbols (s(t)) 205 may be expressed as:

$$s(t) = \sum_n s[n]\delta(t - nT). \quad (1)$$

In the synthesis filter bank 212, the prototype filter h(t) is a pulse-shaping filter that is the same for all subcarriers. Thus, the prototype filter h(t) may also be referred to herein as a pulse-shaping filter, and may be configured as a low-pass filter, such as a square-root Nyquist filter (e.g., square-root raised-cosine). Accordingly, one may note that the set of filters $\gamma_0 h(t)$ through $\gamma_{N-1} h(t)$ may be used to band-limit the stream of input data symbols 205 at each bank of the synthesis filter bank 212 and also to apply spreading gain factors $\gamma_0$ through $\gamma_{N-1}$ to each bank.

The spectrum distribution module 214 includes a set of modulators to the output of each bank to a different frequency within the spread spectrum. In other words, the modulators shift the spectra of the band-limited and spread signals to the set of subcarrier frequencies $f_0$ through $f_{N-1}$. The resulting subcarrier frequencies with the modulated signals are combined as a baseband output signal 215 with a spread-spectrum signal.

The modulator 220 up-converts the baseband output signal 215, represented as x(t), to the RF signal 225 for transmission. Combining equation (1) above with the filter functions of the synthesis filter bank 212 and the modulation function of the spectrum distribution module 214, results in an equation for the baseband output signal 215 as:

$$x(t) = \sum_n \sum_{k=0}^{N-1} \gamma_k s[n] h(t - nT) e^{j2\pi f_k t}. \quad (2)$$

When the subcarrier frequencies $f_k$ are selected such that $f_k T$, for k=0, 1, . . . , N−1, is an integer, $e^{j2\pi f_k t} = e^{j2\pi f_k (t-nT)}$, equation (2) above can be rearranged as:

$$x(t) = \sum_n s[n] g(t - nT) \quad (3)$$

$$\text{where: } g(t) = h(t) p(t) \text{ and} \quad (4)$$

$$p(t) = \sum_{k=0}^{N-1} \gamma_k e^{j2\pi f_k t}. \quad (5)$$

Thus, according to equation (4) above, g(t) may be represented as a multiplication of the prototype filter h(t) and another function of time p(t). This other function of time p(t) represented by equation (5) above may be determined by the spreading gains $\gamma_k$ and the subcarrier frequencies $f_k$.

Equation (3) above may be interpreted as, the FB-MC-SS signal x(t) is obtained by passing the data stream s[n] through the common pulse-shaping filter g(t). The choice of g(t), determined by h(t), the spreading gains $\gamma_k$, and the subcarrier frequencies $f_k$, can result in various forms of FB-MC-SS systems. When h(t) is a rectangular pulse with a width of T equal to the length of an FFT ($T_{FFT}$), plus the length of a cyclic prefix ($T_{CP}$), and the subcarrier frequencies $f_k$ are at the regular interval $1/T_{FFT}$, x(t) will be an OFDM-based SS signal, and, hence, may be referred to as OFDM-SS.

Another example is to generate a filtered multi-tone (FMT)-type spread-spectrum signal. As a non-limiting example, a square-root Nyquist filter may be implemented for h(t). A "root Nyquist" filter may be used as an abbreviation to a square-root Nyquist filter. One example of a square-root Nyquist filter is a square-root raised-cosine filter having a roll-off factor ($\alpha$). Thus, defining h(t) as the impulse response of a square-root raised-cosine filter with a roll-off factor ($\alpha$) and a symbol rate 1/T, and setting the subcarrier frequencies $f_k$ at a regular interval (1+$\alpha$)/T, the baseband output signal 215, x(t) will be an FMT-based SS signal. In addition, other choices of h(t) and $f_k$ that lead to other types of FB-MC-SS are also contemplated. For example, additional examples of square-root Nyquist filters include those described in B. Farhang-Boroujeny, "Square-root Nyquist (M) filter design for digital communication systems," *IEEE Trans. On Signal Processing*, vol. 56, no. 5, May 2008, pp. 2127-2132; and in G. Nigam, R. Singh, and A. K. Chaturvedi, "Finite Duration Root Nyquist Pulses with Maximum In-Band Fractional Energy," *IEEE Commun. Lett.*, vol. 14, no. 9, September 2010, pp. 797-799, the disclosure of each of which is incorporated herein by this reference. In addition, to facilitate a simplified receiver implementation, a roll-off factor ($\alpha$) equal to one may be selected. Other choices of the roll-off factor ($\alpha$) may be used, which may result in some modification to the receiver design.

For discussion, details of an FMT-SS system are developed more fully. Choosing FMT for multi-carrier modulation enables simplicity in analysis and design, which, in turn, results in a simple and robust MC-SS system. To develop the example, assume that N is even, set $\alpha$=1, and spread the subcarrier frequencies $f_k$ at the positions ±1/T, ±3/T, ..., ±(N−1)/T. More specifically, let $f_0$=−(N−1)/T, $f_1$=−(N−3)/T, ..., $f_{N-1}$=(N−1)/T. The spreading gain factors $\gamma_k$ are chosen as:

$$\gamma_k = e^{j\theta_k}, \text{ for } k=0,1,\ldots,N-1 \quad (6)$$

where $\theta_k$ is a set of phase angles that may be chosen to improve on the properties of the MC-SS waveform. Among various choices, $\theta_k = \pi k^2/N$ is an interesting set of phase angles, which belong to a class of polyphase codes. This set of phase angles leads to a transmit signal x(t) with a moderately low peak-to-average-power ratio (PAPR), which may be a significant parameter in designing the pulse shape g(t). As another example, one may also select the phase angles $\theta_k$ randomly. In any case, for any choice of $\theta_k$, in equation (6) above, the following identities hold:

$$|\gamma_k|^2 = 1, \text{ for } k=0, 1, \ldots, N-1. \quad (7)$$

Figure 3A:
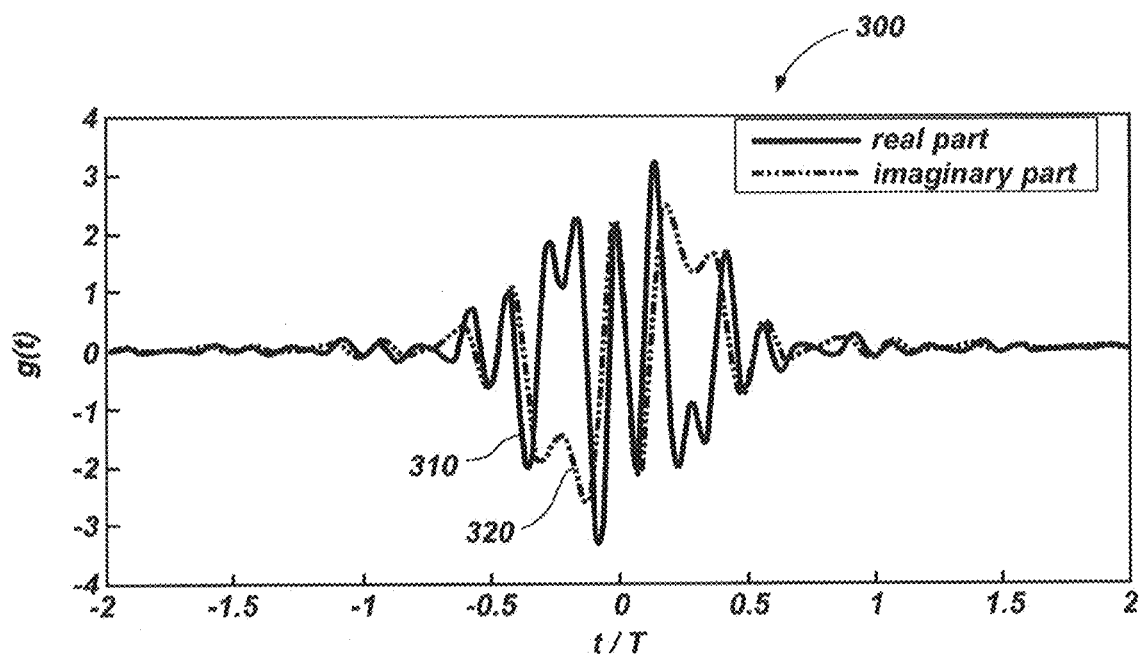
FIG. 3A is a graph that illustrates real and imaginary parts of filtered multi-tone functions in the time domain.
Figure 3B:
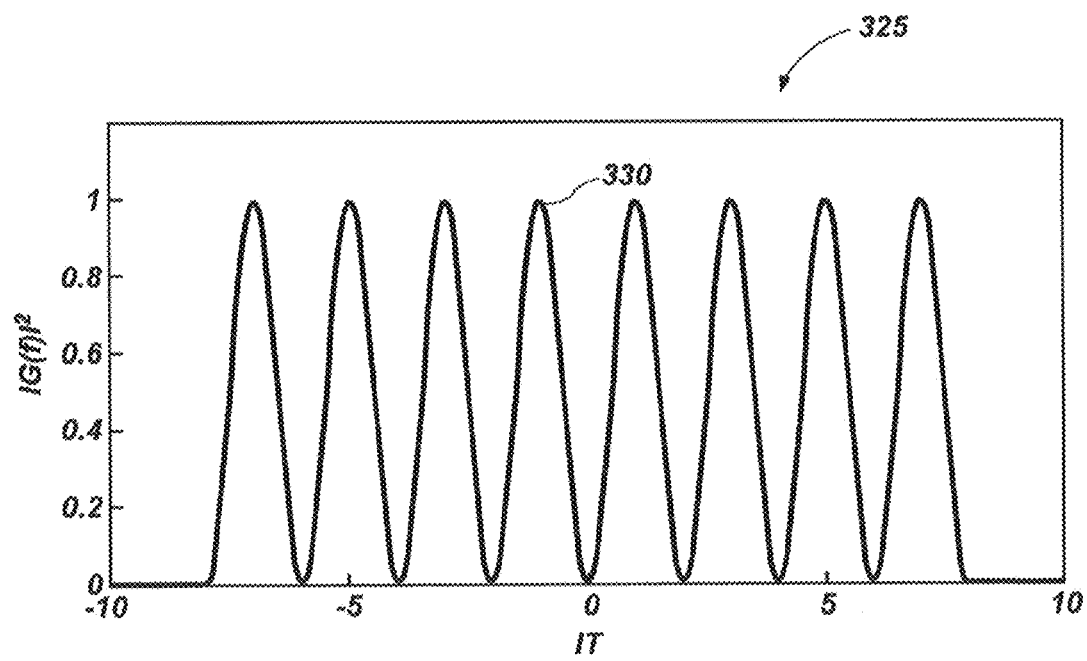
FIG. 3B is a graph that illustrates the filtered multi-tone function in the frequency domain.

FIG. 3A is a graph 300 that illustrates a real part 310 and an imaginary part 320 of a filtered multi-tone function in the time domain. FIG. 3B is a graph 325 that illustrates a filtered multi-tone function 330 in the frequency domain. Specifically, FIGS. 3A and 3B present an example of g(t) and the magnitude-squared of its Fourier transform, $|G(f)|^2$, when N=8 and h(t) is a square-root raised-cosine filter limited to the length of 4 T. One may also note that the MC-SS signal x(t) has a spectrum that resembles that of $|G(f)|^2$.

Although the formulations above are given in terms of continuous time signals and filters, practical generation of the transmit waveform may be conveniently performed in discrete time using efficient signal processing blocks.

Figure 4:
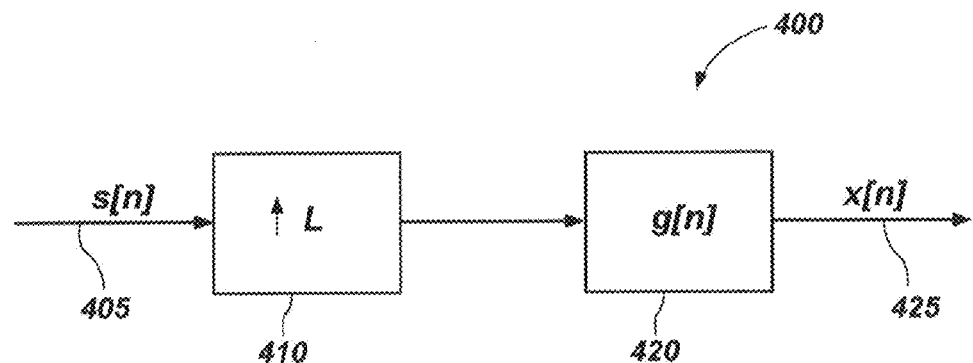
FIG. 4 is a block diagram of a transmitter showing signals represented as digital signals.

FIG. 4 is a block diagram of a transmitter 400 showing signals represented as digital signals. The transmitter 400 includes a sampling rate expander 410 and a discrete realization block 420. The sampling rate expander 410 receives a data symbol 405 and increases the sampling rate by a factor of L by inserting L−1 zeros after each sample of the input s[n]. The discrete-time realization block 420 performs the pulse-shaping filter h(t) and addition of the spreading gains $\gamma_k$, i.e., the synthesis filter bank 212, as well as the spectrum distribution 214 (FIG. 2B). Thus, the sequence g[n] may be thought of as a sampled version of g(t). As with the analog counterpart, the subcarriers are combined to generate a baseband output 425.

Figure 5:
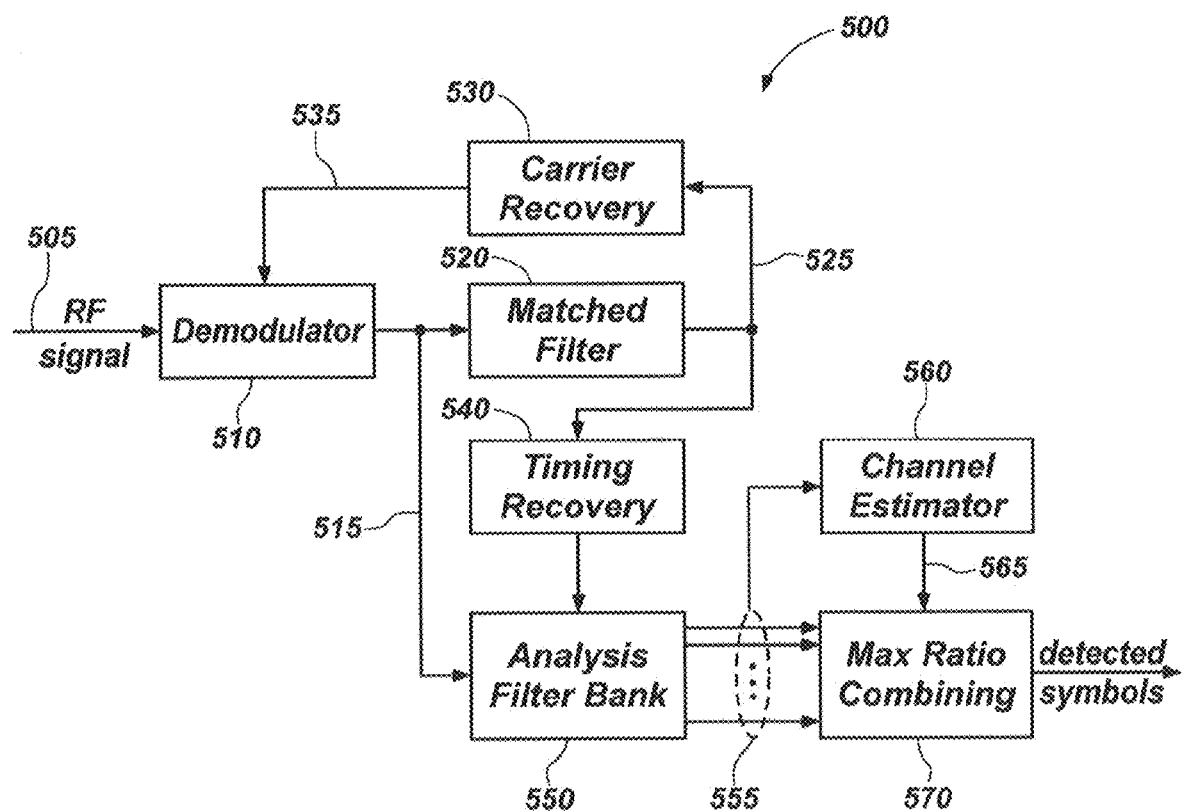
FIG. 5 is a block diagram of a receiver for detecting and decoding an FB-MC-SS signal of FIGS. 1A through 1C.

FIG. 5 is a schematic block diagram of a receiver 500 for detecting and decoding the FB-MC-SS signal 120 (FIG. 1A). The receiver 500 includes a demodulator 510, matched filter 520, carrier recovery unit 530, timing recovery unit 540, analysis filter bank 550, channel estimator 560, and maximum-ratio combining unit 570. An RF signal 505 is received by the receiver 500 for processing. The RF signal 505 may be similar to the RF signal 225 generated by the transmitter 200A of FIG. 2A. Of course, the similarity may be somewhat distorted due to conditions such as multipath, interference, jamming, etc. The demodulator 510 receives the RF signal 505, and converts the RF signal 505 to a baseband input 515. The baseband input 515 is passed to the analysis filter bank 550 and the matched filter 520.

The matched filter 520 is configured to have filter characteristics matched to those of the synthesis filter bank 212 in the transmitter (e.g., 200B of FIG. 2B). With the special selection of the parameters discussed above relative to the transmitter 200B, the output from the matched filter 520 may be the sequence of high amplitude (i.e., narrow) pulses that can be clearly identified even when the FB-MC-SS signal 120 (FIG. 1A) is at a noise level. The combination of the transmit and receive processes may result in a significant and unexpected improvement (both computationally faster and more precise) in timing recovery and frequency lock-in. The FB-MC-SS system improves MC-SS modulation by compensating for frequency and phase difference at the receiver side, providing a carrier and timing acquisition that improves tracking methods, and includes an improved blind channel estimation methodology.

A sequence of narrow pulses 525 from the matched filter 520 may occur at regular intervals and carry the necessary information for timing and carrier acquisition as well as for their tracking. In general, any carrier and timing recovery method takes advantage of the properties of the modulation method that has been used to construct the transmitted signal. Due to the implementation inaccuracies and channel conditions (e.g., accuracy of components and Doppler shift in the channel), the carrier frequency used at the transmitter 200B (FIG. 2B) and its counterpart frequency at the receiver 500 are bound to suffer mismatch.

The carrier recovery unit 530 finds such mismatches and compensates for the mismatches at the receiver 500. To accomplish this carrier recovery, the matched filter 520 may be used to develop relatively efficient carrier and timing recovery algorithms. The output of the matched filter 520 includes the sequence of narrow pulses 525 at the ½ spacing of the symbol timing (T/2). These narrow pulses 525 are present at the time instants that are even multiples of T/2 and correspond to about the center of the data symbols.

On the other hand, at the time instants that are odd multiples of T/2, the presence of such pulses depend on the information bits transmitted before and after the time instant. In other words, and as explained more fully below, the pulse at the odd multiples of T/2 will appear when two consecutive symbols have the same value, otherwise the pulse would be a null. This property of the matched filter 520 enables development of a timing recovery algorithm with a relatively low complexity/processing power. Once the pulses at the even multiples of T/2 are recognized, any carrier offset in the demodulated signal can be identified by comparing the relative phases of the pulses at the successive time instants, leading to carrier frequency recovery.

The carrier recovery unit 530 may receive the sequence of narrow pulses 525 and generate control signals 535 to develop a phase-locked loop (PLL) between the demodulator 510, the matched filter 520, and the carrier recovery unit 530 as is known by those skilled in the art. As the PLL locks on, the phase of the baseband input 515 is known relative to the sequence of narrow pulses 525 from the matched filter 520. As a result, the timing recovery unit 540 may use the sequence of narrow pulses 525 as a synchronization signal to ensure that the demodulated and combined signals from all subcarriers (i.e., the baseband input 515) can be sampled at correct times by the analysis filter bank 550.

The sequence of narrow pulses 525 containing the timing information and the baseband input 515 from the demodulator 510 are passed to the analysis filter bank 550. The analysis filter bank 550 extracts the received signal of each of the various subcarriers in parallel and samples them at a proper timing phase based on the timing information. The analysis filter bank 550 performs the inverse process of the synthesis filter bank 212 of the transmitter 200B (FIG. 2B). Thus, the output of the analysis filter bank 550 is a set of signals 555 corresponding to each of the subcarrier frequencies in the FB-MC-SS signal 120 (FIG. 1A). Due to the very low power level of the received signal, some of these signals in the set of signals 555 may not carry accurate information. However, many of the signals in the set of signals 555 will carry the same information that was transmitted.

The channel estimator 560 examines the set of signals 555 corresponding to each of the subcarrier frequencies to estimate a channel gain and a power of noise plus interference at each of the subcarrier bands by computing the impulse response of each channel in both time and frequency domain. Digital Signal Processing (DSP) and Field-Programmable Gate Arrays (FPGAs) may allow for one example of an inexpensive implementation for many of the functions in the receiver 500 and the channel estimator 560 in particular.

The maximum-ratio combining unit 570 receives the set of signals 555 from the analysis filter bank 550 and information 565 at the output of the channel estimator 560 to obtain an estimate of the transmitted data symbols. The maximum-ratio combining unit 570 calculates a weighted average of the detected data symbols at the output of the analysis filter bank 550. The less noisy outputs are given higher weights and the more noisy outputs are given lower weights. To perform the combining, the maximum-ratio combining unit 570 may divide a power estimate of each channel by the mean square of the estimated noise/interference, which may result in either a diminished noise where the signal is stronger or elimination of the certain subcarriers where the noise/interference is higher than the mean noise.

A detailed mathematical discussion of the processes discussed begins with an exploration of the pulse shape g(t). In a case where the channel is ideal and demodulation is performed perfectly, the demodulator output is the transmit baseband signal x(t) given by equation (3) above. Passing the baseband signal x(t) (e.g., the baseband input 515 in FIG. 5) through a filter matched to the transmit pulse shape g(t) yields an overall response of the system defined as:

$$\eta(t) = g(t) \star g^*(-t) \quad (8)$$

where $\star$ denotes convolution and the superscript * denotes conjugation. Using equations (4) and (5) above in equation (8) above, and noting that, by design, h(-t)=h(t), yields:

$$\eta(t) = \left( \sum_{k=0}^{N-1} \gamma_k h(t) e^{j2\pi f_k t} \right) \star \left( \sum_{l=0}^{N-1} \gamma_l^* h(t) e^{j2\pi f_l t} \right). \quad (9)$$

Note that, by design, $h(t)e^{j2\pi f_k t}$ and $h(t)e^{j2\pi f_l t}$ may be thought of as a pair of filters. Such a pair of filters either has a common band (when $f_k = f_l$) or covers non-overlapping bands. In the latter case, $h(t)e^{j2\pi f_k t} \star h(t)e^{j2\pi f_l t} = 0$. Hence, equation (9) above may be reduced to:

$$\eta(t) = \sum_{k=0}^{N-1} |\gamma_k|^2 (h(t) e^{j2\pi f_k t} \star h(t) e^{j2\pi f_k t}). \quad (10)$$

Straightforward manipulations of equation (10) above and recalling equation (7) above leads to:

$$\eta(t) = \beta(t) \rho(t) \quad (11)$$

where $\rho(t) = h(t) \star h(t)$, by design, is a Nyquist pulse whose peak appears at t=0, and $$\beta(t) = \sum_{k=0}^{N-1} e^{j2\pi f_k t}. \quad (12)$$

Figure 6:
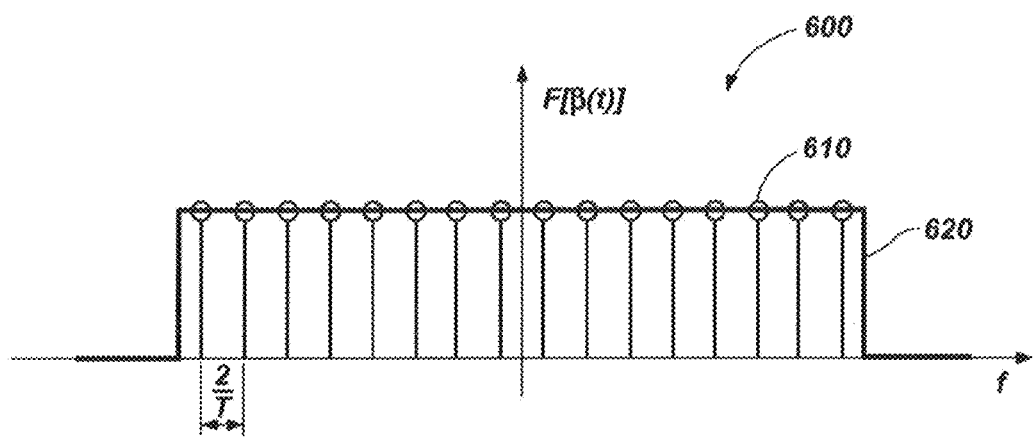
FIG. 6 is a graph illustrating a sinc pulse constructed as a summation of complex sine waves.

FIG. 6 is a graph 600 illustrating a sinc pulse constructed as a summation of complex sine waves. In particular, the graph 600 shows the Fourier transform of β(t) as a train of pulses 610 in the frequency domain. One may notice that β(t) is the summation of N complex sine waves all with a unity amplitude. Hence, the Fourier transform of β(t) is effectively a sampled version of a rectangular pulse 620. Note that the samples in the frequency domain are spaced by 2/T. This implies that β(t) is the train of sinc pulses 710 (FIG. 7) spaced in time at the interval T/2. At t=0 and non-integer multiples of T, all the components of β(t) have a zero phase and, thus, add up to a value of N. At the points where t is an odd multiple of T/2, all the components of β(t) have the phase of π, and thus add up to a value of −N.

Figure 7:
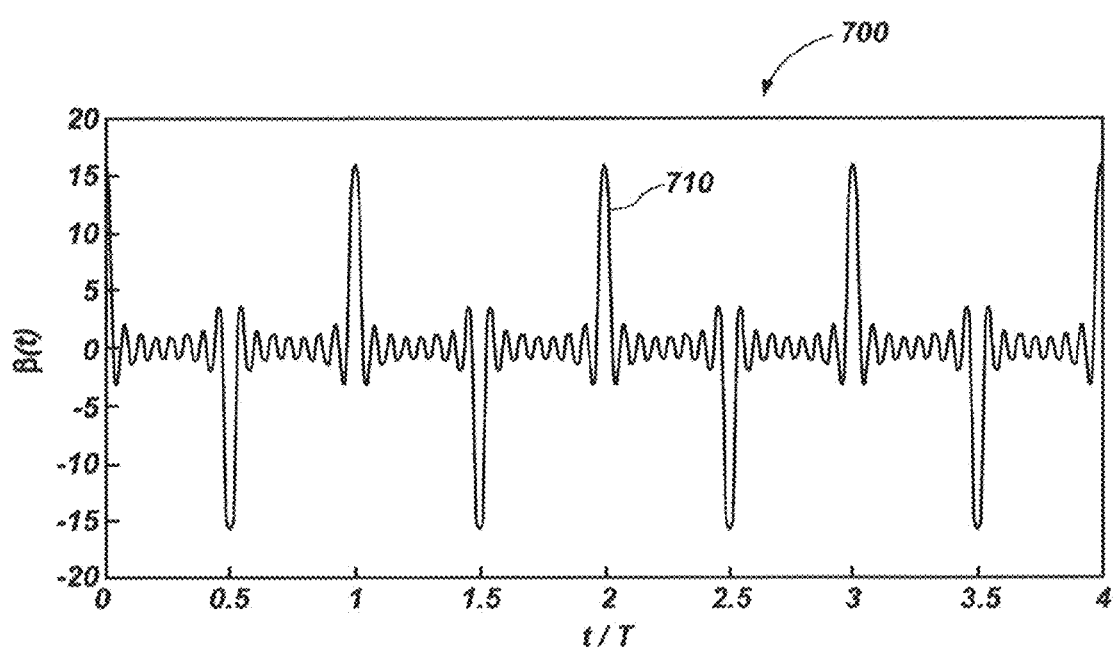
FIG. 7 is a graph illustrating a train of sinc pulses from a matched filter spaced in time at intervals of T/2.

FIG. 7 is a graph 700 illustrating a train of sine pulses 710 from the matched filter spaced in time at intervals of T/2. FIG. 7 shows an example of β(t) for the case where N=16. As N increases and approaches infinity, the train of sinc pulses 710 approaches an impulse train and, thus, η(t) will approach a waveform consisting of a number of impulses (i.e., narrow and tall pulses, when N is finite, but large) whose magnitudes correspond to the samples (or the negated samples) of the Nyquist pulse ρ(t). When the roll-off factor α=1, it can be shown that there are only three non-zero samples of ρ(t), with values of −0.5, 1, and −0.5 at corresponding positions of t=−T/2, 0, and T/2, respectively. Hence, when α=1 and N→∞, $$\eta(t) = -0.5\delta(t+T/2) + \delta(t) - 0.5\delta(t-T/2). \quad (13)$$

This result becomes an approximation when N is finite, but sufficiently large. A more precise expression will be to define:

$$\beta_0(t) = \beta(t) \Pi\left(\frac{t}{T_0}\right) \quad (14)$$

where $\Pi(t/T_0)$ denotes a rectangular pulse with a properly chosen width of $T_0$, and, accordingly, equation (13) above may be written as:

$$\eta(t) = -0.5\beta_0(t+T/2) + \beta_0(t) - 0.5\beta_0(t-T/2). \quad (15)$$

Equation (15) above defines the system response between the input s(t) and the output of the matched filter g*(−t). Hence, using equation (1) above, it can be shown that the output of the matched filter 520 (FIG. 5) is given by:

$$z(t) = \qquad (16)$$

$$\sum_n s[n]\left(-0.5\beta_0\left(t + \frac{T}{2} - nT\right) + \beta_0(t - nT) - 0.5\beta_0\left(t - \frac{T}{2} - T\right)\right) + v_0(t).$$

Figure 8:
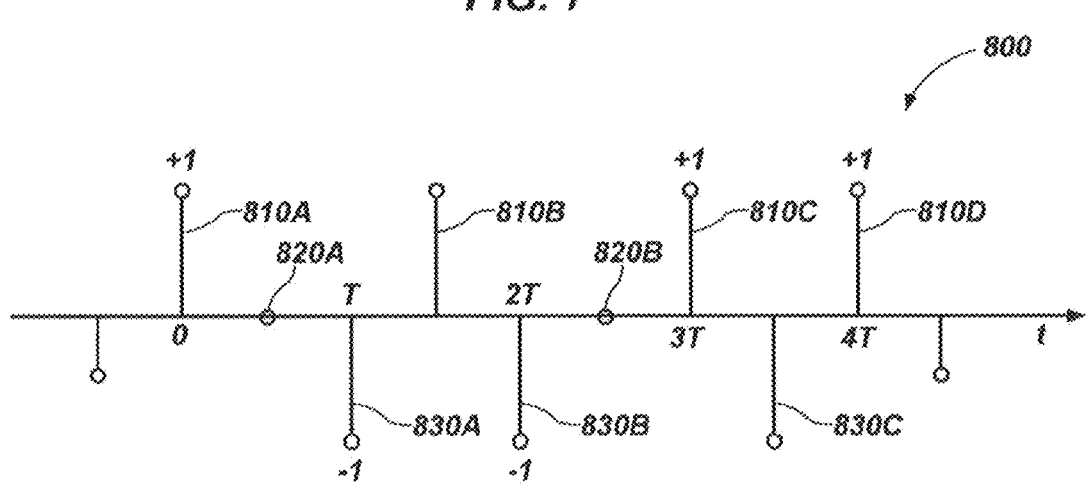
FIG. 8 is a graph illustrating recovery of a data symbol sequence from a matched filter output represented as a train of unit pulses.

FIG. 8 is a graph 800 illustrating recovery of a data symbol sequence from the matched filter output represented as a train of unit pulses. In particular, the graph 800 presents recovery of a typical signal at the output of the matched filter 520 (FIG. 5), where, for clarity of presentation, $\beta_0(t)$ is shown as unit impulses. In general, the impulses each have an amplitude of s[n]. Note that at each position nT an impulse with a unity amplitude appears in either a positive direction (810A, 810C, and 810D) or negative direction (830A and 830B), where T is a time period between data symbols. At midpoints (i.e., (n+0.5)T) the impulse is zero, if s[n]≠s[n+1] (shown as 820A and 820B), or is an impulse with an amplitude −s[n], if s[n]=s[n+1] (shown as 810B and 830C). In other words, a change in the polarity of the next symbol is indicated by a zero at the midpoint between positions nT. The next symbol is the same polarity if there is an impulse in the opposite direction at the midpoint (e.g., 810B, 830C) between positions nT.

In the example of FIG. 8, the symbol sequence is: s[n]={+1, −1, −1, +1, +1}. Midpoint 820A is a zero between positions 0 and T, indicating that the next symbol (830A) after a current symbol (810A) is of the opposite polarity. Similarly, midpoint 820B is a zero between the positions 2T and 3T, indicating that the next symbol (810C) after a current symbol (830B) is of the opposite polarity. On the other hand, midpoint 810B is an impulse in the opposite direction between positions T and 2T, indicating that the next symbol (830B) after a current symbol (830A) is of the same polarity. Similarly, midpoint 830C is an impulse in the opposite direction between positions 3T and 4T, indicating that the next symbol (810D) after a current symbol (810C) is of the same polarity.

With respect to the carrier frequency offset, assuming that channel is ideal, but there exists a carrier frequency offset $\Delta f_c$ between the transmitter and receiver, equation (9) above will become:

$$\eta(t) = \left(\sum_{k=0}^{N-1} \gamma_k h(t) e^{j2\pi(f_k + \Delta f_c)t}\right) \star \left(\sum_{l=0}^{N-1} \gamma_l^* h(t) e^{j2\pi f_l t}\right). \qquad (17)$$

For the case where $0 < \Delta f_c < 2/T$, the subcarrier analysis filters at bands k and k+1 of the receiver will overlap with the transmitted signal from the $k^{th}$ band. Noting this, equation (17) above can yield:

$$\eta(t) = \sum_{k=0}^{N-1} (h(t) e^{j2\pi(f_k + \Delta f_c)t} \star h(t) e^{j2\pi \Delta f_k t}) + \qquad (18)$$

$$\sum_{k=0}^{N-2} \gamma_k \gamma_{k+1}^* \left(h(t) e^{j2\pi(f_k + \Delta f_c)t} \star h(t) e^{j2\pi(f_k + \frac{2}{T})t}\right).$$

Straightforward manipulation of the terms in equation (18) above leads to:

$$\eta(t) = \beta(t)(h(t) e^{j2\pi \Delta f_c t} \star h(t)) + \kappa(t)\left(h(t) e^{j2\pi(\Delta f_c - \frac{2}{T})t} \star h(t)\right) \qquad (19)$$

where $\beta(t)$ is given by equation (12) above, and:

$$\kappa(t) = e^{j(4\pi/T)t} \sum_{k=0}^{N-2} \gamma_k \gamma_{k+1}^* e^{j2\pi f_k t}. \qquad (20)$$

Note that a set of randomly chosen spreading gains $\gamma_k$, $\kappa(t)$, in general, will appear as a noise-like signal. Hence, the second term on the right-hand side of equation (19) above may be treated as time-limited additive noise. Thus, equation (19) above may be written as:

$$\eta(t) = \beta(t)\rho'(t) + \nu(t) \qquad (21)$$

where:

$$\rho'(t) = h(t) e^{j2\pi \Delta f_c t} \star h(t) \qquad (22)$$

and $\nu(t)$ is an additive noise.

Clearly, for $\Delta f_c = 0$, $\rho'(t)$ reduces to $\rho(t)$. As $\Delta f_c$ deviates from zero, $\rho'(t)$ deviates from $\rho(t)$. However, some special features that can be used for synchronization purposes still remain nearly the same. In particular, $|\rho'(t)|$ preserves the shape of $|\rho(t)|$ to a great extent and its amplitude reduces only slightly over a relatively wide range of $\Delta f_c$.

Figure 9:
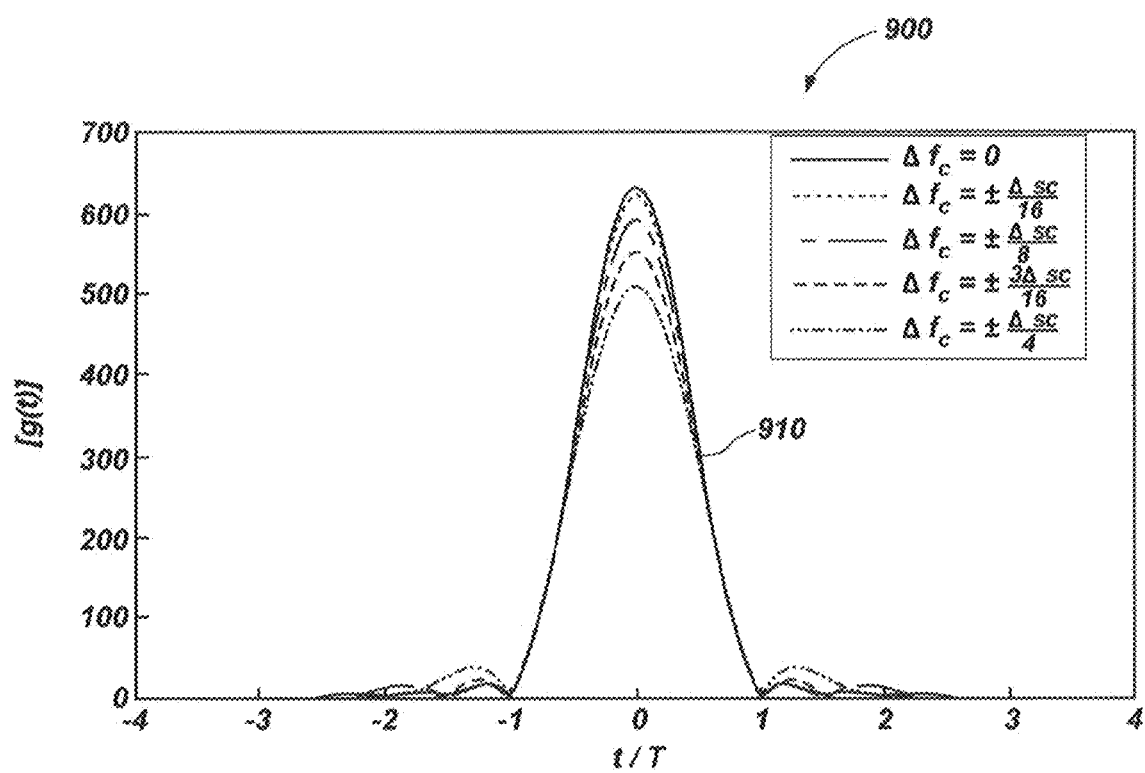
FIG. 9 is a graph illustrating a recovered pulse with different choices for carrier frequency offset.

FIG. 9 is a graph 900 that illustrates a recovered pulse 910 with different choices for carrier frequency offset. The highest amplitude pulse corresponds with the topmost equation in the key shown at the top right of FIG. 9. In other words, the highest amplitude curve corresponds with $\Delta f_c = 0$ and the lowest amplitude curve corresponds with $\Delta f_c = \pm \Delta_{sc}/4$, where $\Delta_{sc} = 2/T$ indicates the subcarrier spacing.

When $\Delta f_c$ approaches 2/T, or passes this value, $\rho'(t)$ vanishes to zero and, thus, no pertinent peak will appear in $\eta(t)$. This, in turn, implies no pertinent peak will appear at the matched filter output, z(t). One can consider this property of the matched filter output to detect the presence of a large frequency offset at the receiver, and, accordingly, search for the correct value of the carrier frequency. For instance, it is possible to run the incoming signal through a set of matched filters tuned to a few choices of $\Delta f_c$ and pick the one that results in pertinent peaks at its output. Further tuning of $\Delta f_c$ can be carried out subsequently.

With respect to the channel impulse response, when the channel is non-ideal, i.e., $c(t) \neq \delta(t)$, n(t) of equation (13) above becomes:

$$\eta(t) = -0.5 c'(t = T/2) + c'(t) - 0.5 c'(t - T/2) \qquad (23)$$

where:

$$c'(t) = c(t) \star \beta_0(t). \qquad (24)$$

For sufficiently large values of T, the three terms on the right-hand side of equation (23) above remain non-overlapping. In fact, for typical values of T and the spread of channel impulse response, c'(t) remains a relatively narrow and tall pulse, or a cluster of narrow and tall pulses.

For channel estimation, once the received signal is carrier compensated and the timing information is obtained, the sampled signal at the outputs of the analysis filter bank 550 (FIG. 5) satisfies the following set of equations:

$$z_k(nT) = \gamma_k C_{BB}(e^{j2\pi f_k}) s[n] + \sigma_k(nT),$$

$$\text{for } k=0,1,\ldots,N-1, \tag{25}$$

where $C_{BB}(e^{j2\pi f_k})$ is the equivalent baseband channel frequency response at the frequency $f_k$ and $\sigma_k(nT)$ arises from the contributions from noise and interfering signals that may exist in the band of transmission.

Noting that $C_{BB}(e^{j2\pi f_k})$ is the Fourier transform of the samples of the channel impulse response, one can use equation (25) above to obtain an estimate of the channel within an ambiguity factor determined by s[n]. When s[n] is known, equation (25) above provides a unique estimate of the channel. When s[n] is unknown, equation (25) above provides an estimate with a sign ambiguity, since $s[n]=\pm 1$. Equation (25) above makes use of one instant of nT for the estimation of the channel impulse/frequency response. In order to average out the noise, and thus obtain a more accurate estimate of the channel impulse response, one may choose to average equation (25) over a number of instants of time nT.

As discussed below, the implementation of an optimum receiver, through the maximum-ratio combining mechanism, requires the estimates of the variance of the elements of the interference vector $\sigma(nT)$. Once the channel estimate is obtained, the latter estimates can be easily obtained by averaging the magnitude square of the noise samples $\sigma_k(nT)$.

Turning to the maximum-ratio combining, substituting the channel estimate $\hat{C}_{BB}(e^{j2\pi f_k})$ in equation (25) above, a simple rearrangement leads to:

$$s'_k[n] = \frac{\gamma_k^*}{\hat{C}_{BB}(e^{j2\pi f_k})} z_k(nT), \tag{26}$$

$$\text{where: } s'_k[n] = s[n] + \frac{\gamma_k^*}{\hat{C}_{BB}(e^{j2\pi f_k})} \vartheta_k(nT), \tag{27}$$

for k=0, 1, . . . , N−1, is a set of noisy estimates of s[n].

One goal may be to combine these noisy estimates to construct an estimate of s[n] with a minimum variance. This construction can be defined as:

$$\hat{s}[n] = w_o^H s'[n] \tag{28}$$

$$\text{where: } w_o = \underset{w}{\arg\min} E\left[|w^H \vartheta'[n]|^2\right] \tag{29}$$

subject to the constraint $w^H u = 1$, $\sigma'[n]$ has the elements $$\frac{\gamma_k^*}{\hat{C}_{BB}(e^{j2\pi f_k})} \vartheta_k(nT),$$

and u is a vector of length N with elements of 1. This problem can be solved using the method of Lagrange multipliers, which results in:

$$w_o = \frac{1}{u^T R_{\vartheta'\vartheta'}^{-1} u} R_{\vartheta'\vartheta'}^{-1} u \tag{30}$$

where $R_{\sigma'\sigma'} = E[\sigma'[n]\sigma'^H[n]]$. Moreover, the variance of the estimation error is obtained as $E[|w_o^H \sigma'[n]|^2] = 1/(u^T R_{\sigma'\sigma'}^{-1} u)$.

In embodiments of the present disclosure, the subcarrier bands are non-overlapping and $R_{\sigma'\sigma'}$ is a diagonal matrix. As a result, using $\sigma_k^2$ to denote the variance of $\sigma_k(nT)$ leads to:

$$R_{\vartheta'\vartheta'} = \begin{bmatrix} \frac{\sigma_0^2}{|\hat{C}_{BB}(e^{j2\pi f_0})|^2} & 0 & \cdots & 0 \\ 0 & \frac{\sigma_1^2}{|\hat{C}_{BB}(e^{j2\pi f_1})|^2} & \cdots & 0 \\ \vdots & \vdots & \ddots & \vdots \\ 0 & 0 & \cdots & \frac{\sigma_{N-1}^2}{|\hat{C}_{BB}(e^{j2\pi f_{N-1}})|^2} \end{bmatrix}. \tag{31}$$

Using equation (31) above in equation (30) above leads to:

$$w_o = \frac{1}{\sum_{k=0}^{N-1} \frac{|\hat{C}_{BB}(e^{j2\pi f_k})|^2}{\sigma_k^2}} \begin{bmatrix} \frac{|\hat{C}_{BB}(e^{j2\pi f_0})|^2}{\sigma_0^2} \\ \frac{|\hat{C}_{BB}(e^{j2\pi f_1})|^2}{\sigma_1^2} \\ \vdots \\ \frac{|\hat{C}_{BB}(e^{j2\pi f_{N-1}})|^2}{\sigma_{N-1}^2} \end{bmatrix}. \tag{32}$$

Many extensions, modifications, or a combination thereof to the proposed transmitter 200A, 200B and receiver 500 are possible. As non-limiting examples, a few are mentioned here. However, a person of ordinary skill in the art would understand that many more modifications and extensions are possible.

The matched filter may be defined as:

$$g^*(-t) = \sum_{k=0}^{N-1} \gamma_k^* h(t) e^{j2\pi f_k t}$$

which includes all the subcarriers. It may be possible to use a modified matched filter:

$$g'^*(-t) = \sum_{k \in \mathcal{K}} \gamma_k^* h(t) e^{j2\pi f_k t} \tag{33}$$

where $\mathcal{K}$ is a subset of $\{0,1,\ldots,N-1\}$ (i.e., only a subset of subcarriers is included in the matched filtering). This change preserves the pertinent properties of the filtered signal z(t) that was used for synchronization purposes. At the same time, this modified matched filter can reduce the effect of strong interferers.

So far, it has been assumed that a symbol s[n] is spread across all the subcarriers at one instant of time nT. A number of symbols (e.g., s1[n], s2[n], . . . ,sM[n]) may be transmitted simultaneously, each of them distributed over a subset of subcarriers. This method will allow an increase in the data rate at a cost of reduced processing gain. Alternatively, one may choose to transmit the same data symbols over a number of time instants, say, nT, (n+1)T, ... (n+P−1)T, (i.e., a period of PT seconds). This method may allow an increase in the processing gain at a cost of reduced data rate.

In the maximum-ratio combining equations presented above, signals from all subcarriers were considered. Clearly, subcarriers that are affected by a significant interference (possibly from a presence of primary users) may be excluded from the equations to reduce the computational complexity.

Much of the discussion herein is directed to FB-MC-SS as one example of SS that may prove useful. However, embodiments of the present disclosure are applicable to a broader class of SS systems, including systems, such as, for example, DSSS/CDMA and OFDM-SS.

2. Overview of Fault-Tolerant Key Generation in Spread-Spectrum Systems

Embodiments of the present disclosure include apparatuses and methods for wireless self-generating secret-keys that can augment security performance of the Radio Frequency (RF) physical-layer of spreading transmission schemes. The secret-key generation takes advantage of channel reciprocity and uses the channel response between the communicating parties to set-up a common key. The common key may be periodically updated based on the reciprocity channel response. This self-generated key is not transmitted over-the-air, and thus precludes compromising the key-value in the presence of an eavesdropper, intruder, or hacker. Creating this self-generating encryption key distinguishes itself from the currently proposed technologies because embodiments of the present disclosure allow some error tolerance in the generated keys.

Although the embodiments discussed herein are applicable to any kind of spread spectrum system, for ease of description and evaluation, much of the discussions related to validating functionality use the FB-MC-SS technology platform discussed above. The readily available channel estimation that is part of the FB-MC-SS system, provides an opportunity for rapid integration of the key generator engine. Analysis and measurements have been performed on various wireless channels to evaluate the implementation, complexities, and feasibility that one may encounter. Some embodiments address solutions to such complexities that may arise and to ensure the feasibility when practicing embodiments of the present disclosure.

Multi-channel spread-spectrum has been discussed in the literature and offers robust performance in the presence of partial band interference. As a result, they have been recognized as a way of secure communications in harsh environments. The FB-MC-SS system, as an example, by its nature, is a method of secure communications. However, the secure communication may be compromised if an adversary/eavesdropper has already obtained the spreading code that is being used for transmission of the FB-MC-SS signal.

Embodiments of the present disclosure provide an advancement in the deployment of spread-spectrum systems in general, and FB-MC-SS systems in particular, in a way that the spreading code (often referred to above as a spreading gain) used by a pair of communicating nodes is dynamically selected in a way that an adversary/eavesdropper has no way of accessing it. The spreading code is selected according to the channel response between the two communicating parties. Because of the reciprocity property of wireless links, this channel is the same for the communicating parties, thus, it is known to them. However, an adversary/eavesdropper has no means of accessing this information, simply because the eavesdropper is at a different location and the multi-path signal between the eavesdropper and each of the communicating devices is different than the multi-path signal between the two communicating parties.

3. Communication Devices

The FB-MC-SS system provides great opportunities to setup a dynamic secret-key between a pair of communicating parties; A and B. The channel impulse response and frequency response identification is an integral part of the FB-MC-SS system and as a result would not need to be re-created in systems practicing FB-MC-SS. However, channel response may be measured in many types of spread spectrum systems and, as a result, secret-key generation as discussed herein may be applied to any of these spread spectrum systems.

Figure 10:
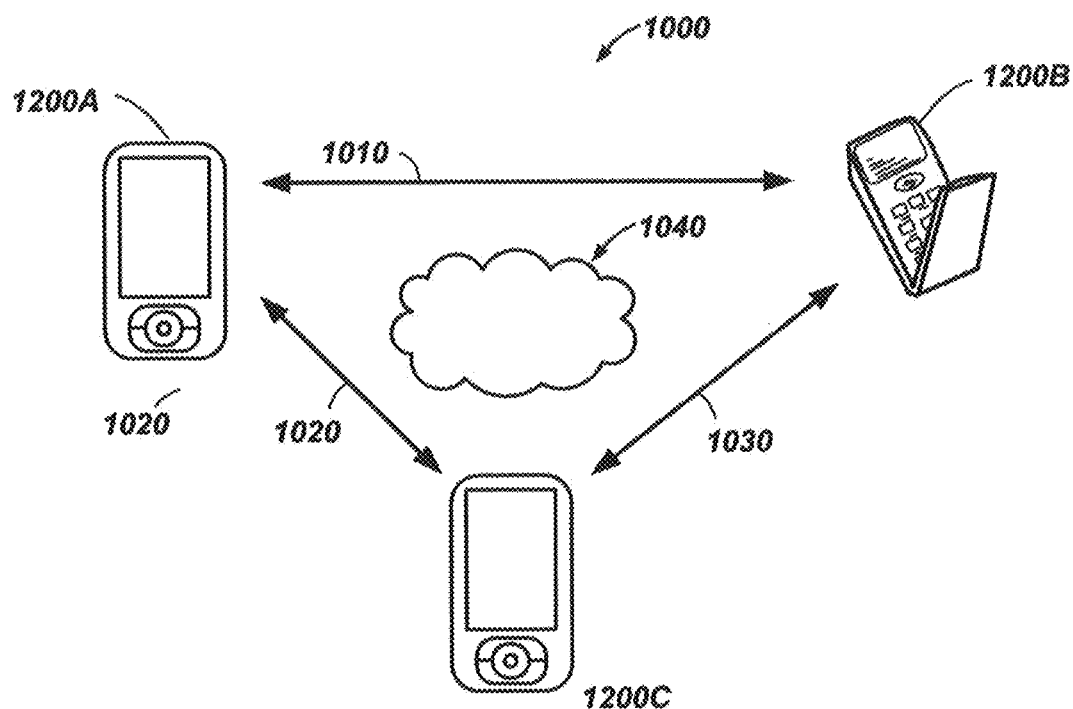
FIG. 10 shows communication operations between two parties and possible signal paths between those parties and an intruding party.

FIG. 10 shows communication operations 1000 between two parties and possible signal paths between those parties and an intruding party. A first communication device 1200A is in communication with a second communication device 1200B via a communication channel 1010. An intruder communication device 1200C may be listening in to communications from the first communication device 1200A through a communication channel 1020 and communications from the second communication device 1200B through a communication channel 1030. A difference in location for the intruder device 1200C relative to either the first communication device 1200A or the second communication device 1200B means there will be differences in the multi-path signal received at the intruder communication device 1200C. Multi-path signal effects 1040 may be caused by obstruction such as, for example, buildings, people, other objects, that may be present between any two communicating devices as well as other environmental properties that may affect signal strength or signal passage between the communicating devices.

Embodiments of the present disclosure use a measured channel response between the first communication device 1200A and the second communication device 1200B. In some spread-spectrum systems, and FB-MC-SS systems in particular, error in the mismatch of spreading codes used by the two communicating parties can be tolerated. This mismatch tolerance implies that spread spectrum systems provide an opportunity to implement a secret-key-based communication system that is fault-tolerant to a mismatch of the keys generated at the first communication device 1200A and the second communication device 1200B.

Because of this fault-tolerant property, embodiments of the present disclosure use a key generation mechanism that can find a key much faster than other proposed methods. As noted above, other proposed methods assume that the secret keys obtained by the communicating parties at the two sides of a link are exactly the same. This equality requires a lengthy period of measurements so that the channel noise could be averaged out to a sufficiently low level, or there will be enough variation in the channel to setup a long enough key. Embodiments of the present disclosure, on the other hand, find an acceptable secret-key in a much shorter period of time. The channel response is used to select the spreading code as the secret-key. Since the system performance degrades gradually as the mismatch between the transmit and received codes increases, some level of errors in the selected keys at the communicating nodes can be tolerated. In other words, we take advantage of the spread spectrum property to define a fault-tolerant key-based communication system.

Another benefit of the fault-tolerant nature of spread spectrum systems in general, and the FB-MC-SS system in particular, is that it allows the implementation of a communication system that can still operate in harsh environments, where a significant level of noise and interference may make the job of setting a perfect secret-key very difficult.

Although the emphasis of this document is on fault-tolerant secret-keys, for a higher level of security, one may wish to generate keys that are exactly, or near exactly, the same at both communication parties. To serve this aspect of the system as well, some embodiments of the present disclosure include additional measures based on fuzzy extractor techniques to bring the codes at the two parties closer to each other.

Embodiments of the present disclosure may use the channel time response, channel frequency response, or a combination thereof to set-up a common key at the first communication device 1200A and the second communication device 1200B. The common key is used to set the spreading code in the spread-spectrum system.

Figure 11:
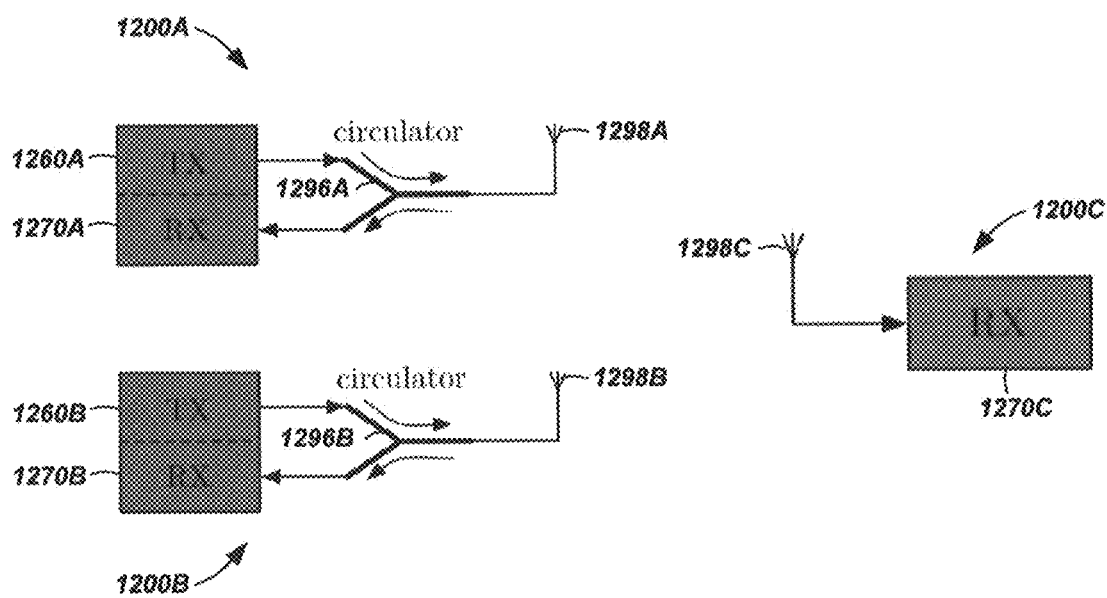
FIG. 11 illustrates an experimental setup of a 3-node network for determining channel response.

FIG. 11 illustrates an experimental setup of a 3-node network for determining channel response. The first communication device 1200A and the second communication device 1200B are the communicating parties, while the intruder communication device 1200C is an intruder whose goal is to listen to the first communication device 1200A and the second communication device 1200B. A single antenna (1298A, 1298B, 1298C) may be used at each of the first communication device 1200A, the second communication device 1200B, and the intruder communication device 1200C. A transmitter (1260A, 1260B) is shown for each of the first communication device 1200A and the second communication device 1200B and a receiver (1270A, 1270B, 1270C) is shown for each of the first communication device 1200A, the second communication device 1200B, and the intruder communication device 1200C. To allow both transmission and reception over the single antenna (1298A, 1298B, 1298C), a circulator circuit (1296A 1296B) may be used. While it is likely the intruder communication device 1200C may include a transmitter and a circulator, they are not shown because for purposes of the experimental setup the intruder communication device 1200C only needs to operate in a receiving mode. As a non-limiting example, the transmitters (1260A, 1260B) and receivers (1270A, 1270B, 1270C) may be set to operate at the same carrier frequency (e.g., 1.75 GHz, for one experiment).

Figure 12:
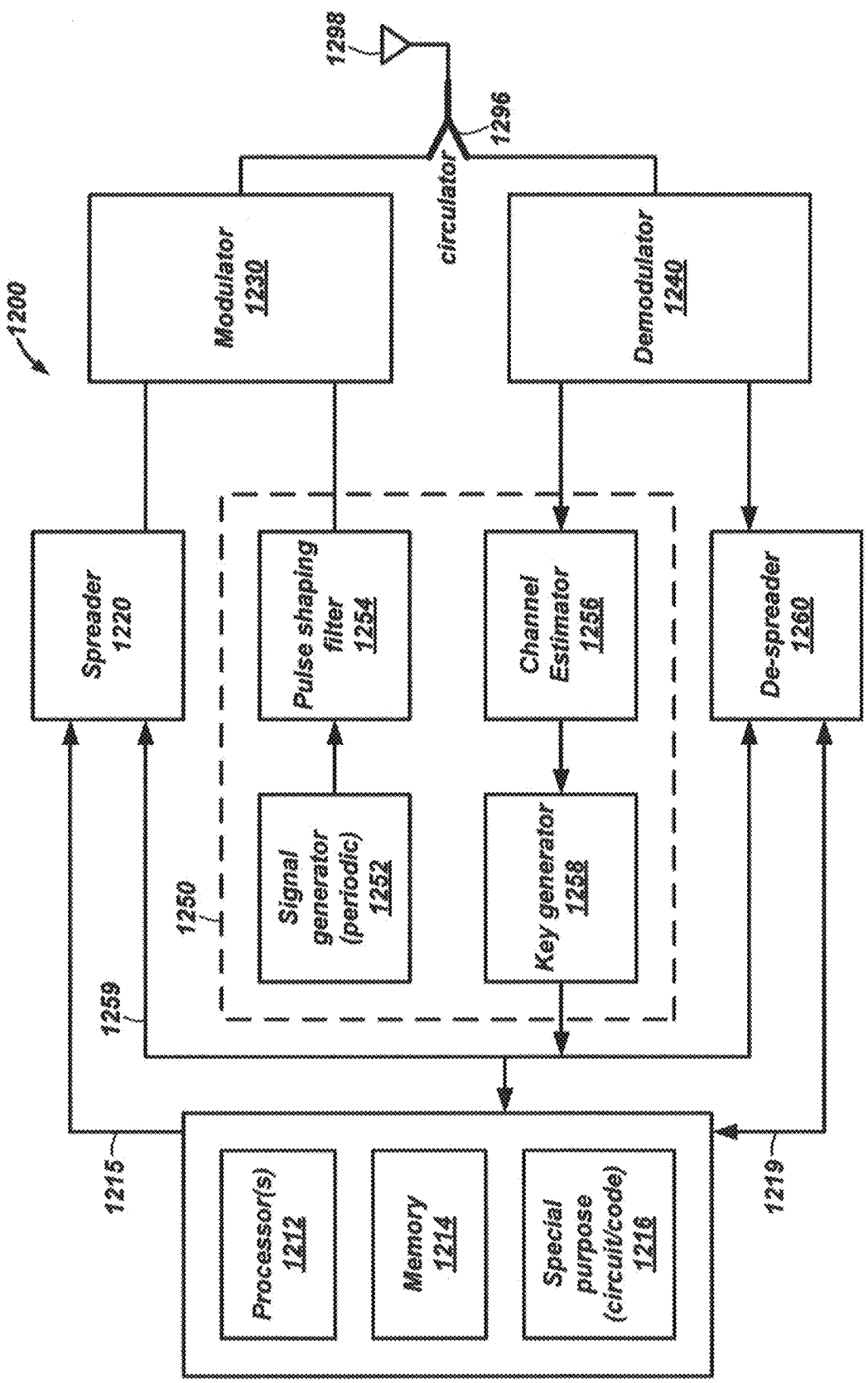
FIG. 12 illustrates a block diagram of a communication device showing some functional modules that may be used in embodiments of the present disclosure.

FIG. 12 illustrates a block diagram of a communication device 1200 showing some functional modules that may be used in embodiments of the present disclosure. The communication device 1200 may be any device suitable for communication on one or more spread-spectrum channels, such as, for example, radios, cellular telephones, cellular base stations, wireless routers, computers, tablet devices, and other personal communication devices.

The communication device 1200 may be configured for executing software programs containing computing instructions and may include one or more processors 1212, memory 1214, and other special purpose modules 1216. The special purpose modules 1216 may include circuitry, computing instructions, or a combination thereof.

In general, most of the modules discussed in connection with FIG. 12 are defined as functional modules. As such, all or a portion of the modules may be configured as circuitry, computing instructions, or a combination thereof. Some functions to be performed in connection with embodiments of the present disclosure may need to be performed in real-time or near real-time. As a result, specific circuitry may be utilized for some functions such that the functions are performed fast enough. However, as technology advances, some of these functions may be able to be performed by software executed by a general-purpose processor, a digital signal processor, or a combination thereof.

Thus, the one or more processors 1212 may be configured for executing a wide variety of operating systems and applications including the computing instructions for carrying out embodiments of the present disclosure. In addition, the processor 1212 may be a general-purpose processor, a digital signal processor, a microcontroller, or a combination thereof.

The memory 1214 may be used to hold computing instructions, data, and other information for performing a wide variety of tasks including performing embodiments of the present disclosure. By way of example, and not limitation, the memory 1214 may include Synchronous Random Access Memory (SRAM), Dynamic RAM (DRAM), Read-Only Memory (ROM), Flash memory, Solid-State Drive (SSD), and the like.

FIG. 11 is intended for discussing a simplified version of a communication device 1200. A person of ordinary skill in the art will recognize that the communication device 1200 may be configured in many different ways with different types of interconnecting buses between the various elements. Moreover, the various elements may be subdivided physically, functionally, or a combination thereof.

By way of non-limiting example, computing instructions for performing processes discussed herein may be stored on a storage (not shown), transferred to the memory 1214 for execution, and executed by the processors 1212. The processors 1212, when executing computing instructions configured for performing the processes, constitute structure for performing the processes and can be considered a special-purpose computer when so configured.

A group 1250 of key processing modules may include a signal generator 1252, a pulse shaping filter 1254, a channel estimator 1256, and a key generator 1258. Functions of these elements are discussed more fully below.

A spreader 1220 may use a secret key quantized phase 1259 from the key generator 1258 along with other information 1215 from the processor 1212 or special purpose module 1216. This other information 1215 may include information such as a data symbol to be transmitted and other spreading information to be combined with the secret key quantized phase 1259 to develop a final spreading code to be used. The spreader 1220 may feed signals to a modulator 1230 to modulate the signals to one or more carrier frequencies and then sent through the circulator 1296 for transmission on the antenna 1298.

A de-spreader 1260 may be used to take demodulated signals from a demodulator 1240 and use the secret key quantized phase 1259 along with other spreading information 1215 to extract a data symbol 1219.

4. Channel Response

In discussing channel response, reference will be made to FIGS. 10, 11, and 12. At this point, it should be noted that according to the theory of reciprocity both the first communication device 1200A and the second communication device 1200B will measure substantially the same channel response from B to A and from A to B, respectively. Nevertheless, differences exist due to channel noise, measurement errors, or combinations thereof. Hence, as discussed below, in some embodiments components (i.e., side information) of the generated keys may be communicated between the first communication device 1200A and the second communication device 1200B to make the two keys as similar as possible (but, not necessarily exactly the same as exact similarity is not needed due to the fault-tolerant features of embodiments of the present disclosure).

To measure the channel response, embodiments of the present disclosure transmit a beacon signal from the first communication device 1200A to the second communication device 1200B and from the second communication device 1200B to the first communication device 1200A. The beacon signal may be developed by the signal generator 1252 as a periodic signal and processed by a pulse-shaping filter 1254 before being modulated by the modulator 1230 and sent out through the circulator 1296 and the antenna 1298. The beacon signal may include a number of tones regularly spaced across a band of interest.

A concept of cyclic channel estimation has been developed and can best be explained by considering the transmission of a periodic sequence of data symbols . . . , s[N], s[0], s[1], s[2], . . . , s[N], s[0], . . . through a communication channel. We also recall that any communication channel may be represented by its equivalent baseband impulse response $c_{BB}(t)$. Accordingly, we formulate the problem of the cyclic channel estimation as follows.

Figure 13:
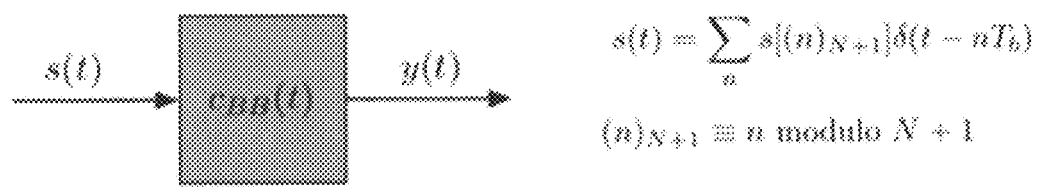
FIG. 13 illustrates a case where a periodic data symbol sequence is passed through a communication channel.

FIG. 13 presents a case where the periodic data symbol sequence . . . , s[N], s[0], s[1], s[2], . . . , s[N], s[0], . . . is passed through the communication channel $c_{BB}(t)$. Here, for simplicity, we assume that there is no channel noise. The goal is to find $c_{BB}(t)$ at a set of discrete time instants $t=0, T_s, 2T_s, \ldots$, where, typically, $T_s=T_b/2$, and $T_b$ is the data symbol (baud) interval. Since the input to the channel in FIG. 13 is periodic with a period of $(N+1)T_b$, its output, y(t), is also periodic with the same period. More explicitly y(t) can be written as:

$$y(t) = \sum_n s[(n)_{N+1}] c_{BB}(t - nT_b). \tag{34}$$

One can find from equation (34) that:

$$y(kT_s) = \sum_n s[(n)_{N+1}] c_{BB}(kT_s - nT_b). \tag{35}$$

Substituting $T_s=T_b/2$ in (2), we obtain:

$$y\left(k\frac{T_b}{2}\right) = \sum_n s[(n)_{N+1}] c_{BB}\left((k - 2n)\frac{T_b}{2}\right). \tag{36}$$

Next, we consider the two cases of k even and odd, i.e., when k=2 m and k=2 m+1, separately. When k=2 m, (3) simplifies to:

$$y(mT_b) = \sum_n s[(n)_{N+1}] c_{BB}((m - n)T_b) \tag{37}$$
$$= \sum_n c_{BB}(nT_b) s[(m - n)_{N+1}].$$

Assuming that the duration of $c_{BB}(t)$ is limited to $(N+1)T_b$, one will obtain from equation (37):

$$y(mT_b) = \sum_{n=0}^{N} c_{BB}(nT_b) s[(m - n)_{N+1}] \tag{38}$$

Careful examination of (5) reveals that if m is chosen such that m mod (N+1)=N, one will obtain $$\begin{bmatrix} s[N] & s[N-1] & s[N-2] & \cdots & s[0] \\ s[0] & s[N] & s[N-1] & \cdots & s[1] \\ s[1] & s[0] & s[N] & \cdots & s[2] \\ \vdots & \vdots & \vdots & \ddots & \vdots \\ s[N-1] & s[N-2] & s[N-3] & \cdots & s[N] \end{bmatrix} \tag{39}$$

$$\begin{bmatrix} c_{BB}(0) \\ c_{BB}(T_b) \\ c_{BB}(2T_b) \\ \vdots \\ c_{BB}(NT_b) \end{bmatrix} = \begin{bmatrix} y(mT_b) \\ y((m+1)T_b) \\ y((m+2)T_b) \\ \vdots \\ y((m+N)T_b) \end{bmatrix}$$

Assuming that the beacon is chosen such that the matrix:

$$S = \begin{bmatrix} s[N] & s[N-1] & s[N-2] & \cdots & s[0] \\ s[0] & s[N] & s[N-1] & \cdots & s[1] \\ s[1] & s[0] & s[N] & \cdots & s[2] \\ \vdots & \vdots & \vdots & \ddots & \vdots \\ s[N-1] & s[N-2] & s[N-3] & \cdots & s[N] \end{bmatrix} \tag{40}$$

is invertible, one can find the vector:

$$c_{BB}(0) = \begin{bmatrix} c_{BB}(0) \\ c_{BB}(T_b) \\ c_{BB}(2T_b) \\ \vdots \\ c_{BB}(NT_b) \end{bmatrix} \tag{41}$$

of the samples of the channel impulse response as $$c_{BB}(0) = S^{-1} y(mT_b) \tag{42}$$

$$\text{where: } y(mT_b) = \begin{bmatrix} y(mT_b) \\ y((m+1)T_b) \\ y((m+2)T_b) \\ \vdots \\ y((m+N)T_b) \end{bmatrix} \tag{43}$$

We note that in equations (41) and (43) the arguments of '0' for $c_{BB}(0)$ and $mT_b$ for $y(mT_b)$ refer to the first element of the respective vectors.

One may also notice that if a shift in time is introduced to the first sample of the vector $y(mT_b)$, e.g., it is replaced by $y(mT_b+\tau)$, the same shift will be introduced into the rest of the elements of $y(mT_b)$, and consequently into the elements of the extracted channel response. For example, if $\tau=T_b/2$ (the case of k=2 m+1, above), the following impulse response of the channel will be extracted.

$$c_{BB}(0.5T_b) = \begin{bmatrix} c_{BB}(0.5T_b) \\ c_{BB}(1.5T_b) \\ c_{BB}(2.5T_b) \\ \vdots \\ c_{BB}((N+0.5)T_b) \end{bmatrix}$$

If $\tau=T_b$, the extracted channel impulse response will be:

$$c_{BB}(T_b) = \begin{bmatrix} c_{BB}(T_b) \\ c_{BB}(2T_b) \\ c_{BB}(3T_b) \\ \vdots \\ c_{BB}(NT_b) \\ c_{BB}(0) \end{bmatrix}$$

Note how $c_{BB}(0)$ has shifted to the end of the vector. This is a consequence of the periodic property of $s[n]=s[(n)_{N+1}]$, viz., any shift in time translates to a circular shift of the vector $c_{BB}$ over a length $(N+1)T_b$.

Considering the above discussion, a sample of the measured channel is constructed by taking the following steps:

1. To take into account the excess bandwidth of the channel beyond the range $$-\frac{1}{2T_b} \le f \le \frac{1}{2T_b}$$

samples of the channel response at the rate of $$\frac{K}{T_b}$$

(spacing $$\frac{T_b}{K})$$

are estimated following equation (42) and using the sample vectors $y_{BB}((m+k/K)T_b+\tau)$, for $k=0, 1, \ldots, K-1$.

2. The calculated $c_{BB}(k/K)=S^{-1}y_{BB}((m+k/K)T_b+\tau)$, for $k=0, 1, \ldots, K-1$, are interleaved to form the channel impulse response vector:

$$\overline{c}_{BB}(\tau) = \begin{bmatrix} c_{BB}(\tau) \\ c_{BB}(T_b/K + \tau) \\ c_{BB}(2T_b/K + \tau) \\ \vdots \\ c_{BB}((K-1)T_b/K + \tau) \\ c_{BB}(T_b + \tau) \\ \vdots \\ c_{BB}((N + (K-1)/K)T_b + \tau) \end{bmatrix} \quad (44)$$

3. The ambiguity in timing phase $\tau$ may be inevitable because noise and other hard to manage factors will affect its choice. A method of minimizing this ambiguity is presented later (see operation 1504 in FIG. 15 and described below).

To provide more insight to the process of channel estimation, we present a frequency domain interpretation of the above equations. Recall the block diagram of FIG. 11. Also, recall that the input/beacon, $s(t)$, to the channel, $c_{BB}(t)$, is periodic. From the theory of Fourier series, this implies that $s(t)$ can be expanded as a summation of sine waves, consisting of a fundamental frequency and the associated harmonics. Mathematically, this may be written as:

$$s(t)=a_0 \cos(2\pi f_0 t+\phi_0)+a_1 \cos(2\pi f_1 t+\phi_1)+a \cos(2\pi f_2 t+\phi_2)+ \quad (45)$$

where $f_0$ is the fundamental frequency, $f_1=2f_0$ is the first harmonic, $f_2=3f_0$ is the second harmonic, and so on. The parameters $a_k$ and $\phi_k$, $k=0, 1, 2, \ldots$, are the respective amplitudes and phases. Using $S_k$ to denote $a_k e^{j\phi_k}$, i.e., a complex number that combines and signifies $a_k$ and $\phi_k$.

Figure 14A:
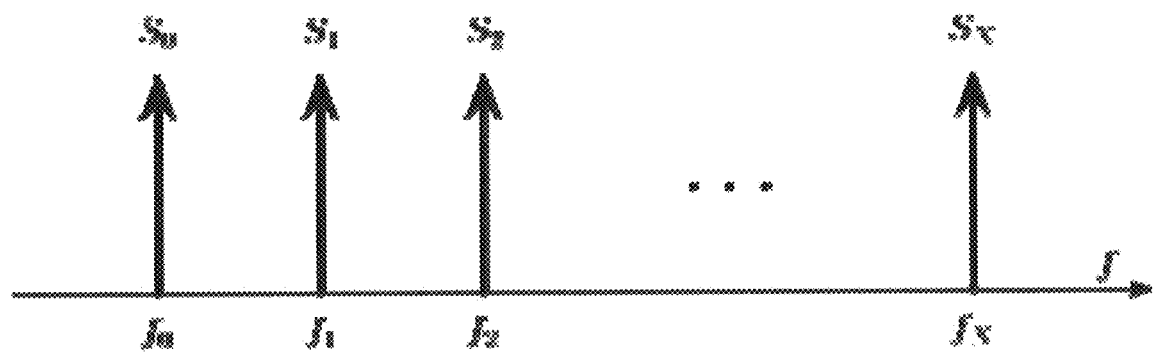
FIG. 14A illustrates an input beacon to be passed through a communication channel.

FIG. 14A is a pictorial representation of the input beacon $s(t)$ in the frequency domain. Note that the number of harmonies in FIG. 14A is limited to N. This is to reflect the fact that the transmission channel is band limited to not more than the first N harmonics of $s(t)$.

After passing through the channel, each of the tones in FIG. 14A will be affected by the respective channel gain, $C_{BB}(f_k)$. This channel passage leads to a received signal which an example of its spectrum is presented in FIG. 14B.

Figure 14B:
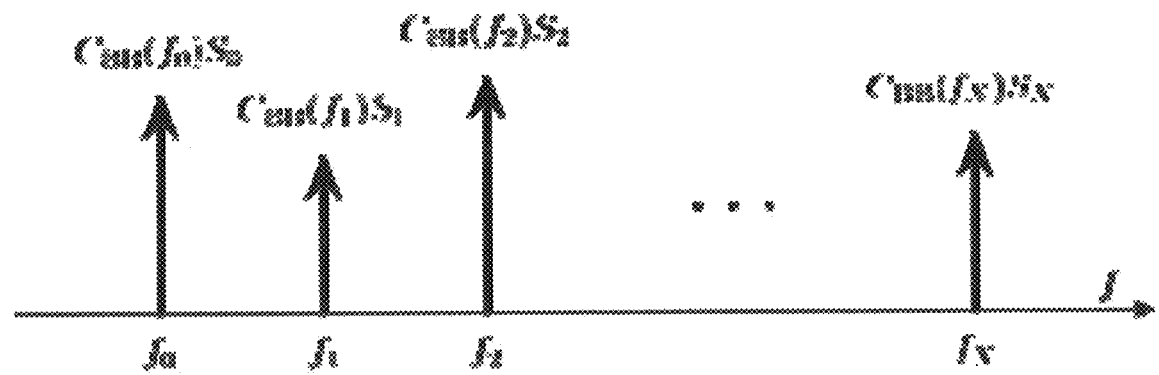
FIG. 14B illustrates a response to the input beacon after it has passed through the communication channel.

Assuming the receiver is aware of the spectrum in FIG. 14A, comparing it with the spectrum of the received signal in FIG. 14B, the receiver can estimate the channel magnitude response $C_{BB}(f_k)$, for $k=0, 1, 2, \ldots$. This channel response compared to the mathematical equations that where presented above may be thought as an alternative (but, equivalent) method of channel estimation. One may choose either of the two methods.

5. Secret-Key Generation Algorithms

Figure 15:
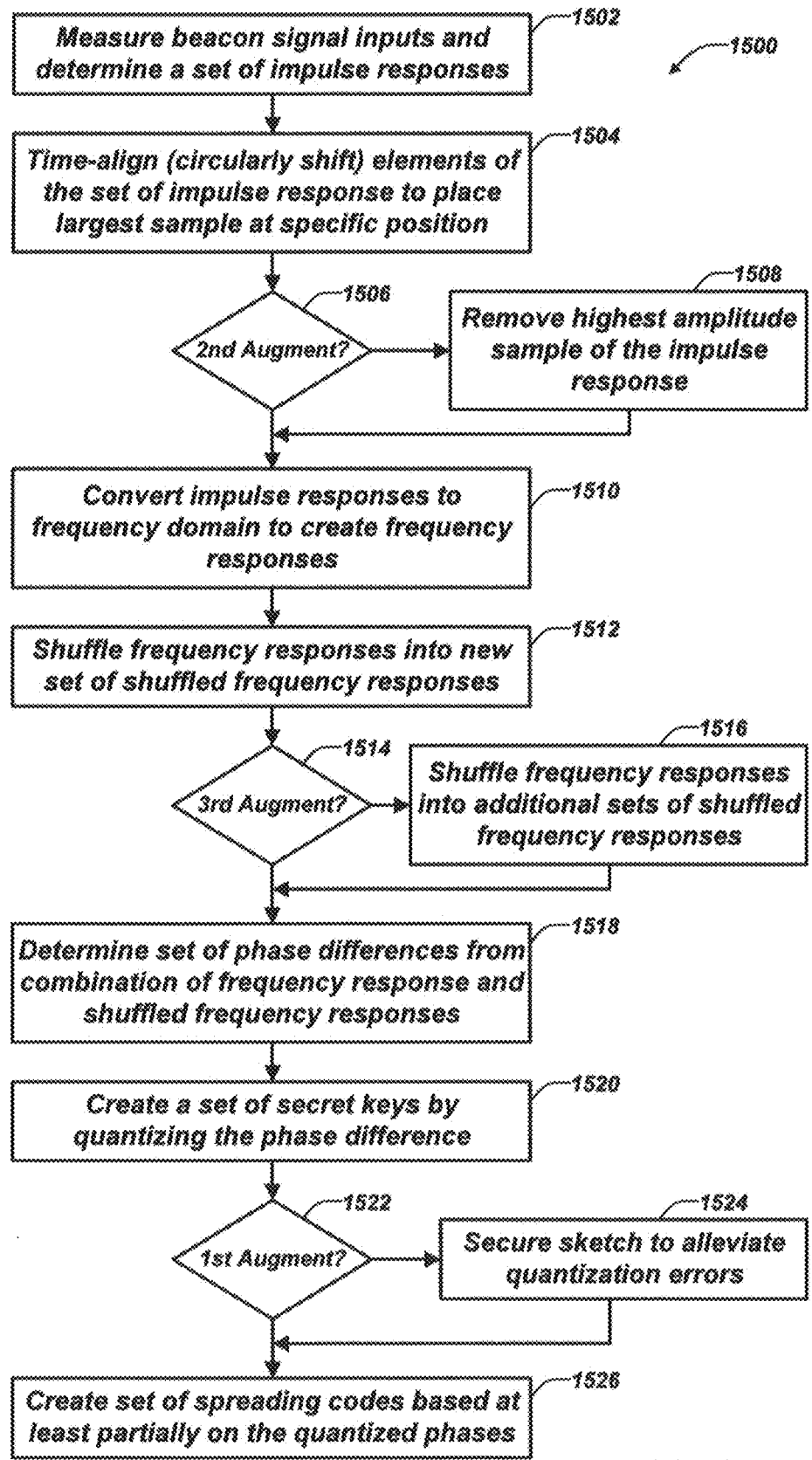
FIG. 15 is a flow diagram of a process illustrating some operations that may be performed in generation of a secret key according to embodiments of the present disclosure.

FIG. 15 is a flow diagram of a process 1500 illustrating some operations that may be performed in generation of a secret key according to embodiments of the present disclosure. References may also be made to FIGS. 10, 11, and 12 in describing the process 1500 of FIG. 15. In general, these operations are performed on each of the first communication device 1200A and the second communication device 1200B with a similar result. In addition, the operations may be performed on the intruder communication device 1200C, however, the results will be very different. While not specifically illustrated, a person of ordinary skill in the art will recognize that the processes illustrated in FIG. 15 may be periodically repeated such that the secret key may be regularly updated as the channel between the communication devices changes.

Operation block 1502 indicates that the beacon signal sent from the other communication device is measured and processed as described above to determine a set of impulse responses. Once the channel, $c_{BB}$, is measured, hence, its estimated impulse responses $\hat{c}_{BB}^A$ and $\hat{c}_{BB}^B$ are known at the first communication device 1200A and the second communication device 1200B, respectively, a variety of algorithms can be developed to translate the impulse responses $\hat{c}_{BB}^A$ and $\hat{c}_{BB}^B$ to secret keys at each communication device. Clearly, when $\hat{c}_{BB}^A \approx \hat{c}_{BB}^B$, the resulting keys will also be approximately the same, but not necessarily exactly the same. Such small differences as discussed before may be compensated for in spread-spectrum systems. On the other hand, the intruder communication device 1200C may also measure a channel impulse response $\hat{c}_{BB}^C$. However, there is a high probability that the impulse response of the intruder communication device 1200C is significantly different from both the impulse responses ($\hat{c}_{BB}^A$ and $\hat{c}_{BB}^B$). As a result, the intruder communication device 1200C will not be able to generate a secret key similar to those of the first communication device 1200A and the second communication device 1200B.

Operation block 1504 indicates that the impulse response $c_{BB}$ may be time-aligned (e.g., by circularly shifting it), such that a largest sample within the impulse response appears at a predefined position. As a non-limiting example, the largest sample may be placed at the middle. The result of the time alignment may be referred to as, $c_{BB}^{al}$.

Decision block 1506 indicates that a check is made to determine if a second algorithm augmentation process should be performed. If so, operation block 1508 indicates that this second algorithm augmentation process is performed. Details of the second algorithm augmentation process are discussed below.

Operation block 1510 indicates that the impulse response, which may be the time-aligned impulse response $c_{BB}^{al}$ is converted to the frequency domain. As a non-limiting example, a Discrete Fourier Transform (DFT) may be applied to the time-aligned impulse response $c_{BB}^{al}$ to generate a frequency response $C_{BB}^{al}$. In some embodiments, the frequency response $C_{BB}^{al}$ may be limited to a predetermined passband of interest.

Operation block 1512 indicates that the elements of the frequency response $C_{BB}^{al}$ are shuffled to develop a shuffled frequency response. Let n denote the sample indices of the frequency response $C_{BB}^{al}$ that correspond to all the sample indices or the sample indices in a passband portion of the channel. Thus, $C_{BB}^{al}(n)$ denotes the respective elements of the frequency response $C_{BB}^{al}$ that will be used in subsequent processing. Also, let m denote another index vector that is obtained by shuffling the elements of n, and accordingly define the respective vector as a shuffled frequency response $C_{BB}^{al}(m)$. The shuffling may be performed based on a predetermined shuffle scheme. As a non-limiting example, the predetermined shuffle scheme may be a pseudo-random shuffling where all the communication devices would use the same shuffling pattern.

Decision block 1514 indicates that a check is made to determine if a third algorithm augmentation process should be performed. If so, operation block 1516 indicates that this third algorithm augmentation process is performed. Details of the third algorithm augmentation process are discussed below.

Operation block 1518 indicates that a set of phase differences are determined from combining the frequency response $C_{BB}^{al}$ and the shuffled frequency response $C_{BB}^{al}(m)$. For this process, define the vector $\theta = \angle C_{BB}^{al}(n) - \angle C_{BB}^{al}(m)$, where $\angle(\cdot)$ denotes the angle. The vector θ is referred to herein as a set of phase differences.

Operation block 1520 indicates that a set of secret-key quantized phases are generated by quantizing each element of the set of phase differences θ. As two non-limiting examples, the elements of θ may be quantized to the Quadrature Phase-Shift Keying (QPSK) angles 45°, 135°, 225° and 315° or the 8 way Phase-Shift Keying (8PSK) angles 0°, 45°, 90°, 135°, 180°, 225°, 270°, 315°. The result of this quantization is a set of secret-key quantized phases.

Decision block 1522 indicates that a check is made to determine if a first algorithm augmentation process should be performed. If so, operation block 1524 indicates that this first algorithm augmentation process is performed. Details of the first algorithm augmentation process are discussed below.

Operation block 1526 indicates that the secret-key quantized phases may be used to define or modify the spreading code to be used when transmitting and receiving data. As a non-limiting example for a FB-MC-SS system, the spreading codes may be defined by:

$$\gamma_k' = \gamma_k e^{j\theta(k)} \quad (46)$$

6. Algorithm Augmentations

The above algorithm may result in some mismatches of the generated secret-key quantized phases at the first communication device 1200A and the second communication device 1200B. Below are some defined algorithm augmentations that may reduce some of these mismatches, cause the secret-key quantized phase at the intruder communication device 1200C to deviate more, or combinations thereof.

6.1. First Algorithm Augmentation—Secure Sketch

When an element of the secret-key quantized phases θ is close to any of the boundary lines (e.g., 0°, 90°, 180° or 270° in a QPSK quantization) between the quantization targets, a small perturbation of that element of θ (due to inaccuracy of the measured channel responses) can result in a difference between the generated keys at the first communication device 1200A and the second communication device 1200B (FIG. 10).

Figure 16A:
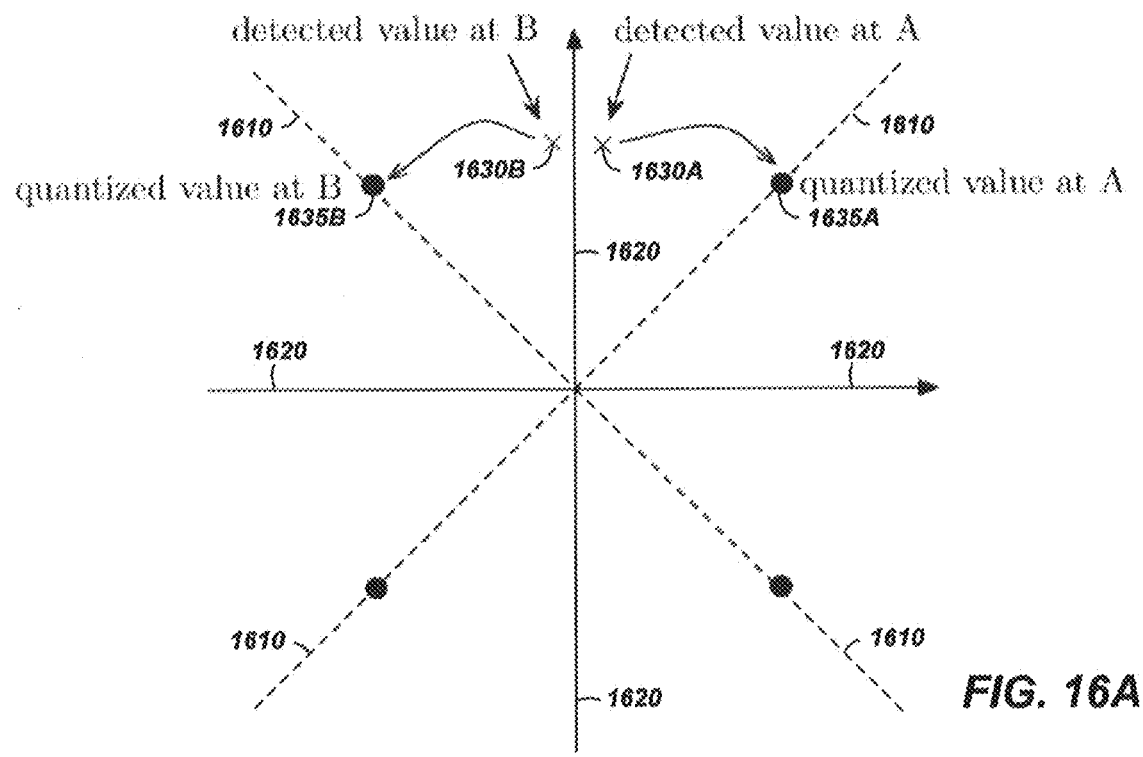
FIG. 16A illustrates a QPSK quantization of a phase difference at each of the first communication device and the second communication device.

FIG. 16A illustrates a QPSK quantization of a phase difference at each of the first communication device 1200A and the second communication device 1200B.

Figure 16B:
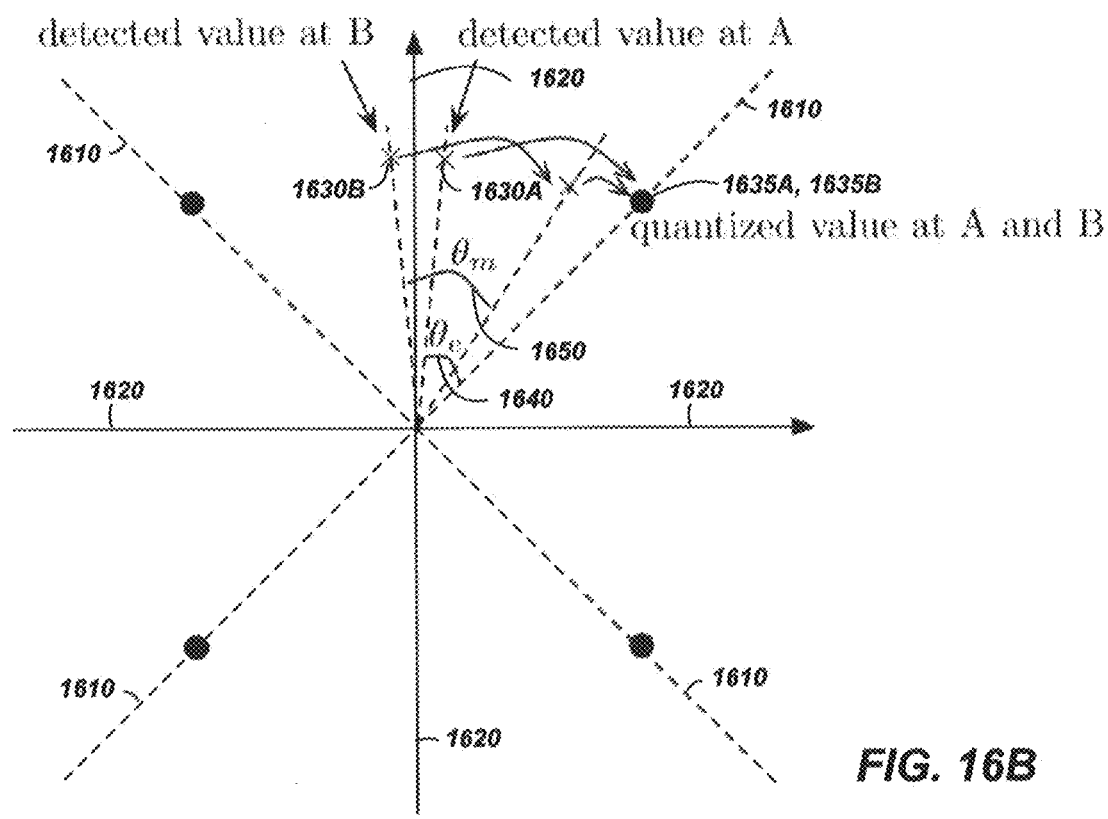
FIG. 16B illustrates the QPSK quantization of the phase difference with a quantization error considered to compensate for possible inaccuracies.

FIG. 16B illustrates the QPSK quantization of the phase difference with a quantization error considered to compensate for possible inaccuracies.

Quantization targets 1610 are illustrated as dashed lines and boundaries 1620 between the quantization targets 1610 are illustrated as solid lines. Point 1630A illustrates a detected value for a phase difference for the first communication device 1200A and point 1635A illustrates where this detected value is quantized to on the quantization target 1610. Similarly, point 1630B illustrates a detected value for a phase difference for the second communication device 1200B and point 1635B illustrates where this detected value is quantized to on the quantization target 1610. Note that although the phase differences at points 1630A and 1630B are not very different, they are quantized to very different points 1635A and 1635B.

This quantization inaccuracy can be alleviated by adopting a secure sketch method, which operates as follows. One of the communication devices, say the first communication device 1200A, for each quantization, sends a quantization error angle $\theta_e$ 1640 as shown in FIG. 16B. The other communication device, say the second communication device 1200B, modifies its corresponding measured point by an angle indicated as $\theta_m$ 1650 and quantizes the result. This process, as demonstrated in FIG. 16B solves the problem of the key mismatches that may be caused by the problem presented in FIG. 16A.

Of course, the quantization error may also be determined by the second communication device 1200B and sent to the first communication device 1200A where the phase difference is modified by the quantization error before quantizing the phase difference in the first communication device 1200A. This quantization and secure sketch example can easily be extrapolated to other quantization schemes, such as, for example, Binary PSK or 8PSK.

6.2. Second Algorithm Augmentation—Strongest Path Removal

Examining the basic algorithm described above, and its augmented version according to the method of secure sketch reveals that the basic algorithm results in keys that are about 90% similar between the first communication device 1200A and the second communication device 1200B. This level of accuracy may be sufficient in many of the practical cases, when used along with the FB-MC-SS or DSSS communication techniques. The secure sketch augmentation brings the keys set at the first communication device 1200A and the second communication device 1200B to almost 100% similarity. However, experiments have shown that the intruder communication device 1200C (which may also receive the quantization error transmissions), may also generate a more accurate key that is 30% to 50% similar to those of the first communication device 1200A and the second communication device 1200B. This change in accuracy, unfortunately, may allow the intruder communication device 1200C to listen to the communications of the first communication device 1200A and the second communication device 1200B with some reduced, but still intelligible quality.

Further research revealed that the above issue could be resolved to a great extent by making the following modification to the key generation algorithm. To explain this modification and the reason behind why it brings the observed improvement, consider the case where the first communication device 1200A transmits and the second communication device 1200B and the intruder communication device 1200C receive and there is only one wireless path between A and B and another single path between A and C. In that case, the channels seen by the second communication device 1200B and intruder communication device 1200C will only be different by a complex flat gain. This gain does not impact the generated key, as the phase angle caused by this gain will be subtracted when the difference $\theta = \angle C_{BB}^{al}(n) - \angle C_{BB}^{al}(m)$ is calculated. Noting this, it can be said that the main source responsible for similarity of the key generated by the intruder communication device 1200C with those of the communicating parties (A and B) is due to the strongest path in the wireless links.

Hence, the strongest path (e.g., the highest amplitude sample of the time domain impulse response) from the channel responses may be removed before executing the basic algorithm (and possibly the secure sketch method). Experiments with this modification proved to be very effective, causing the key generated by the intruder communication device 1200C to be very different from those of the communicating parties. This augmentation of the key generation algorithms may also be referred to as strongest path cancellation (SPC).

6.3. Third Algorithm Augmentation—Additional Phase Shuffle

Although the application of the first and second augmentations made the keys generated at the first communication device 1200A and the second communication device 1200B almost 100% similar, experiments show the key generated by the intruder communication device 1200C was not completely independent of those at A and B. Further research through experiments revealed that the correlation between the key generated at the intruder communication device 1200C and those at the first communication device 1200A and the second communication device 1200B can be reduced to zero if additional phase shuffling is performed.

Thus a first additional shuffle scheme can be used to generate a first additional shuffled frequency response and a second additional shuffle scheme can be used to generate a second additional shuffled frequency response. Thus, the formula $\theta = \angle C_{BB}^{al}(n) - \angle C_{BB}^{al}(m)$ is replaced by $\theta = \angle C_{BB}^{al}(n) - \angle C_{BB}^{al}(m_1) + \angle C_{BB}^{al}(m_2) - \angle C_{BB}^{al}(m_3)$, where $m_1$, $m_2$ and $m_3$ are three independently shuffled versions of n. As with the original shuffling scheme, the first and second additional shuffling schemes may be defined by a pseudo-random shuffling process where all the communication devices would use the same shuffling pattern.

7. Numerical Results

To evaluate the performance of the key generation algorithms and confirm the above predictions, we obtained 50 samples of the channel responses between the nodes A and B (A to B and B to A) and also those of B to C. Given a shuffled vector m of the ordered index n=[1,2,3, ... L], and assuming that m is known to the first communication device 1200A, the second communication device 1200B, and the intruder communication device 1200C, and following the algorithms discussed above, each node generates a secret-key based on the channel available to it, and accordingly generates the spreading gains $\gamma_k' = \gamma_k e^{j\Theta(k)}$. We call these gains $\gamma'_{A,k}$, $\gamma'_{B,k}$, and $\gamma'_{C,k}$, for the nodes A, B, and C, respectively. Ideally, $\gamma'_{A,k}$ and $\gamma'_{B,k}$ should be equal, and $\gamma'_{C,k}$ should be uncorrelated with $\gamma'_{A,k}$ and $\gamma'_{B,k}$. To evaluate the quality of designed keys by different algorithms, we calculate the partial correlations between different pairs from $\gamma'_{A,k}$, $\gamma'_{B,k}$, and $\gamma'_{C,k}$, when for each channel a large number of randomly generated shuffled index vectors m are examined. The partial correlations for the pair $\gamma'_{A,k}$ and $\gamma'_{B,k}$ is defined as:

$$\kappa_{AB} = \frac{\sum_k \gamma'_{A,k} \gamma'^{*}_{B,k}}{\sqrt{\left(\sum_k |\gamma'_{A,k}|^2\right)\left(\sum_k |\gamma'_{B,k}|^2\right)}}. \tag{47}$$

The partial correlations $\kappa_{AC}$ and $\kappa_{BC}$ are defined similarly. We evaluate $\kappa_{AB}$ and $\kappa_{AC}$, for the choices of m that we have made, and present the corresponding Cumulative Distribution Functions (CDFs), where CDF at a point x is defined as the probability of a given random variable be larger than x, e.g., CDF of $\kappa_{AB}$ is defined as $F(x) = P(\kappa_{AB} > x)$, where $P(\cdot)$ denotes the probability.

Figure 17:
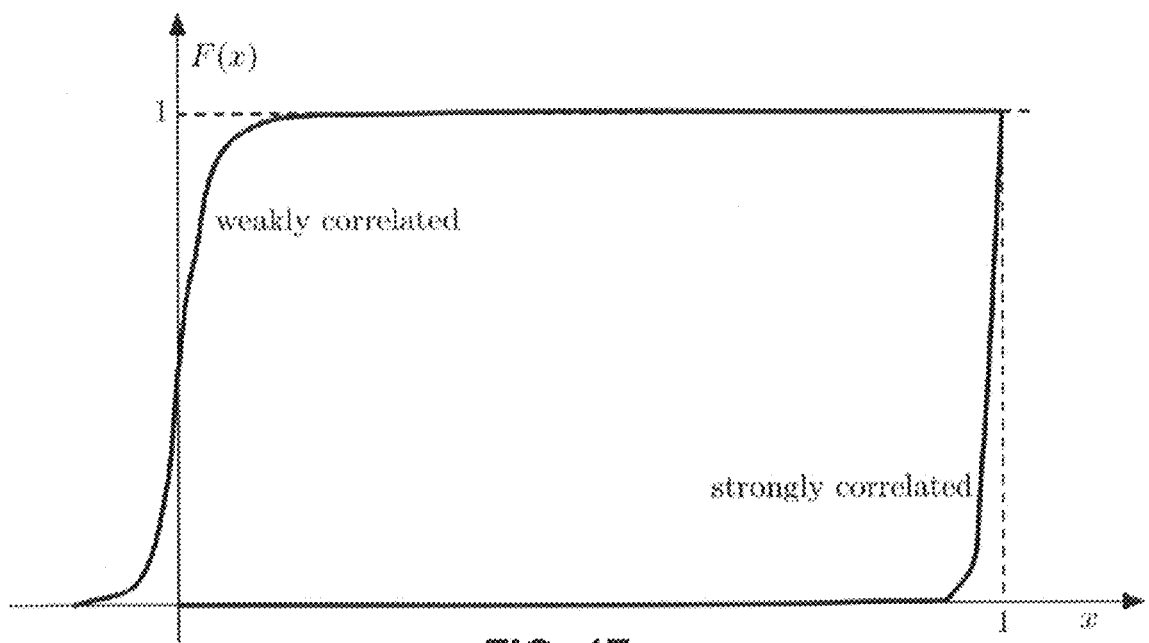
FIG. 17 presents two typical Cumulative Distribution Function (CDF) plots of partial correlations between two random variables.

FIG. 17 presents two typical CDF plots of partial correlations between two random variables: (i) the case that the two random variables are similar/close to each other (what we like to be true for $\gamma'_{A,k}$ and $\gamma'_{B,k}$); and (ii) the case that the two random variables are dissimilar (what we like to be true for $\gamma'_{A,k}$ and $\gamma'_{C,k}$). Note that in the latter case the CDF plots should be ideally odd-symmetric with the respect to point (x=0, F(x)=0.5). Any correlation between $\gamma'_{A,k}$ and) $\gamma'_{C,k}$ shift the CDF to the right.

Figure 18:
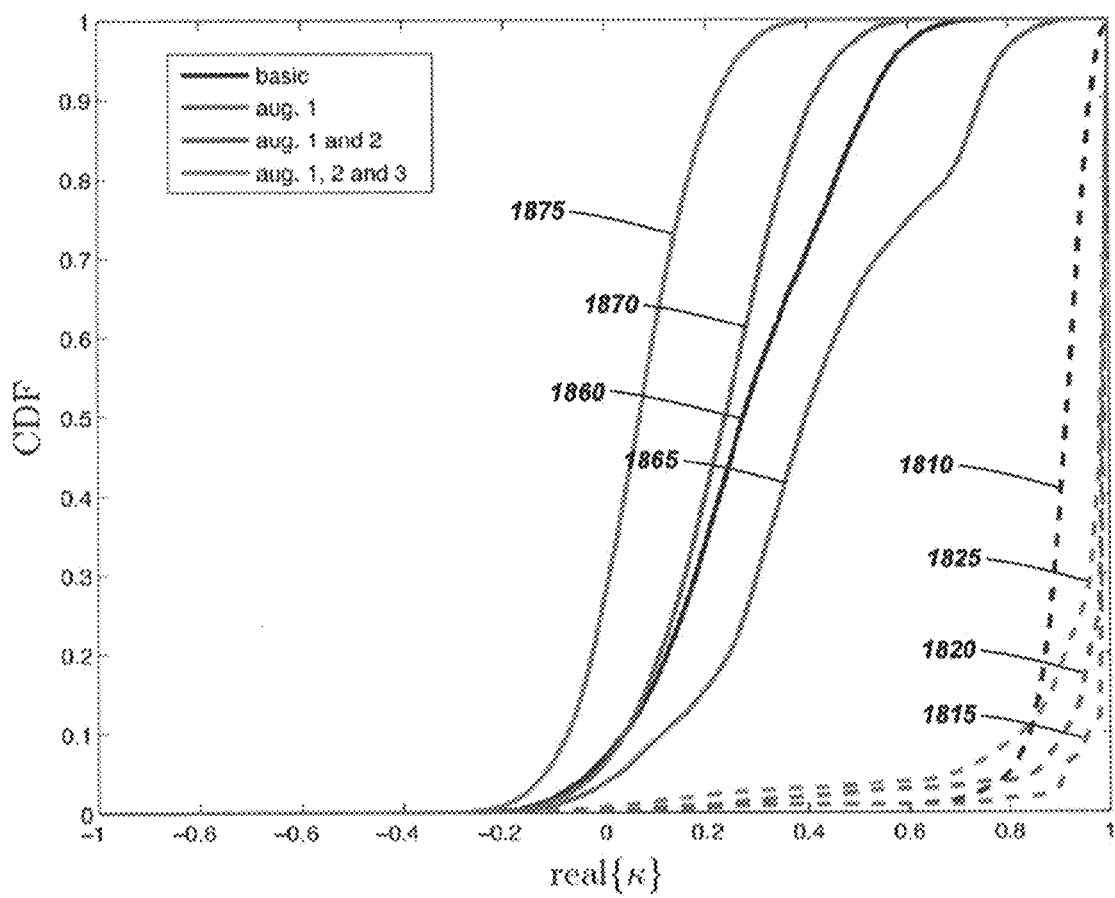
FIG. 18 presents various CDFs obtained from a set of experiments.

FIG. 18 presents the actual CDFs obtained from a set of experiments. We note that since κ values are, in general complex, we look at the real part of them.

Dashed lines are those of $\kappa_{AB}$ for different key generation algorithms. Solid lines are those of $\kappa_{AC}$ for the same different key generation algorithms. Thus, for $\kappa_{AB}$, line 1810 shows the basic algorithm, line 1815 shows the algorithm including the first augmentation, line 1820 shows the algorithm including the first augmentation and the second augmentation, and line 1825 shows the algorithm including the first augmentation, the second augmentation, and the third augmentation.

Similarly, for $\kappa_{AC}$, line 1860 shows the basic algorithm, line 1865 shows the algorithm including the first augmentation, line 1870 shows the algorithm including the first augmentation and the second augmentation, and line 1875 shows the algorithm including the first augmentation, the second augmentation, and the third augmentation. Note that the best performance is obtained when all three augmentations 1, 2, and 3 are included. From these results, the following observations can be made.

The basic algorithm generates keys that are about 90% similar at the first communication device 1200A and the second communication device 1200B. At the same time the key generated at the intruder communication device 1200C is about 50% similar to that of A and B.

Adding the secure sketch (the first augmentation) to improve the quality of keys, we find that the keys generated at the first communication device 1200A and the second communication device 1200B are almost 100% similar, however, the key generated at the intruder communication device 1200C also becomes more similar to the one at the first communication device 1200A (and the second communication device 1200B). While the former is desirable, the similarity of the key at the intruder communication device 1200C with those of the first communication device 1200A and the second communication device 1200B is undesirable.

The problem of the similarity of the generated key at the intruder communication device 1200C with those at the first communication device 1200A and the second communication device 1200B is resolved, to a great extent, by applying the additional step of removing the strongest path from each measured impulse response; i.e., the second augmentation.

Finally, further improvement is observed if we apply the third augmentation. Note that even with the third augmentation, the correlation between the key generated by the intruder communication device 1200C and those of the first communication device 1200A and the second communication device 1200B is slightly biased to the right. However, this is minimal and it is believed to have no serious effect in practice.

8. Data Transmission

Once the key is generated and the spreading codes/gains $\gamma'_{A,k}$, for the first communication device 1200A, and $\gamma'_{B,k}$, for the second communication device 1200B, are calculated according to equation (46) above, the data transmission may begin. More specifically, as an example, to transmit a data symbol s[n] the first communication device 1200A uses the spreader 1220 to spread multiple copies $\gamma'_{A,k}$s[n], for k=0, 1, ..., N, and transmit them through the modulator 1230.

The second communication device 1200B receives these copies that may possibly be distorted by channel response and additive noise, demodulates them with the demodulator 1240 and the de-spreader 1260 uses the spreading gains $\gamma'_{B,k}$ to de-spread the copies and extract s[n]. The procedure for despreading is known to those familiar with the details of the spread spectrum systems, and thus is not elaborated further.

While the disclosure is susceptible to various modifications and implementation in alternative forms, specific embodiments have been shown by way of examples in the drawings and have been described in detail herein. However, it should be understood that the invention is not intended to be limited to the particular forms disclosed. Rather, the invention includes all modifications, equivalents, and alternatives falling within the scope of the following appended claims and their legal equivalents.

What is claimed is:

1. A method of self-generation of a fault-tolerant encryption key on a communication device, the method comprising:
   detecting a plurality of beacon signals at a plurality of frequencies received from an additional communication device;
   determining a set of impulse responses from the plurality of beacon signals;
   circularly shifting the set of impulse responses to place a largest sample at a predefined position in the set of impulse responses;
   converting the set of impulse responses to a set of frequency responses in a frequency domain;
   shuffling the set of frequency responses with a predetermined shuffle scheme to develop a set of shuffled frequency responses;
   determining a set of phase differences as a difference between an angle of the frequency response and an angle of the shuffled frequency response at each element of the corresponding sets;
   quantizing each phase difference of the set to develop a set of secret-key quantized phases; and
   developing a set of spreading codes wherein each spreading code of the set includes a corresponding phase of the set of secret-key quantized phases.

2. The method of claim 1, further comprising modifying the set of frequency responses by eliminating at least some frequency responses of the set that are outside a predetermined passband prior to shuffling the set of frequency responses.

3. The method of claim 1, wherein quantizing each phase difference comprises quantizing the phase differences to four or more substantially equally spaced phases.

4. The method of claim 1, wherein quantizing each phase difference of the set further comprises:
   determining a quantization error for each phase difference of the set to define a set of quantization errors; and
   transmitting the set of quantization errors to the additional communication device.

5. The method of claim 1, wherein quantizing each phase difference of the set further comprises:
   receiving a set of quantization errors from the additional communication device; and
   applying each quantization error of the set to each phase difference of the set prior to the quantizing.

6. The method of claim 1, further comprising removing a highest amplitude sample of the channel impulse response prior to the acts of converting the set of impulse responses to a set of frequency responses, shuffling the set of frequency responses, determining the set of phase differences, quantizing each phase difference, and developing the set of spreading codes.

7. The method of claim 1, wherein the set of frequency responses is identified as $C_{bb}(n)$, the set of shuffled frequency responses is identified as $C_{bb}(m1)$, and shuffling the set of frequency responses further comprises:
   shuffling the set of frequency responses with a first additional shuffle scheme to develop a first additional shuffled frequency response ($C_{bb}(m2)$); and
   shuffling the set of frequency responses with a second additional shuffle scheme to develop a second additional shuffled frequency response ($C_{bb}(m3)$); and
   wherein determining the set of phase differences comprises performing the operation, angle($C_{bb}(n)$)–angle($C_{bb}(m1)$)+angle($C_{bb}(m2)$)–angle($C_{bb}(m3)$), wherein "n" is an ordered index, and "m1," "m2," and "m3" are each distinct shuffled versions of "n".

8. The method of claim 1, further comprising periodically repeating the acts of detecting, determining a set of impulse responses, circularly shifting, converting, shuffling, determining a set of phase differences, quantizing, and developing to develop a new set of secret-key quantized phases.

9. The method of claim 1, further comprising transmitting a spread-spectrum signal including an encoding of a data symbol using the set of spreading codes.

10. The method of claim 1, further comprising transmitting a spread-spectrum signal on the plurality of frequencies, the spread-spectrum signal including an encoding of a data symbol at each frequency of the plurality using the set of spreading codes.

11. The method of claim 1, further comprising receiving a spread-spectrum signal and decoding a data symbol by applying the set of spreading codes to the spread-spectrum signal.

12. The method of claim 1, further comprising:
   receiving a spread-spectrum signal including a plurality of spectra, each spectrum of the plurality at a corresponding frequency of the plurality of frequencies; and
   decoding a data symbol at each frequency of the plurality using the set of spreading codes.

13. A method of self-generating a fault-tolerant encryption key separately on each of a first communication device and a second communication device, the method comprising:
  on the first communication device:
    transmitting a plurality of beacon signals at a plurality of frequencies on a communication channel; and
    determining a set of impulse responses responsive to the plurality of beacon signals received from the second communication device;
  on the second communication device:
    transmitting the plurality of beacon signals at the plurality of frequencies on the communication channel; and
    determining a set of impulse responses responsive to the plurality of beacon signals received from the first communication device; and
  on each of the first communication device and the second communication device:
    circularly shifting the set of impulse responses for that device to place a largest sample at a predefined position in the set of impulse responses;
    converting the set of impulse responses to a set of frequency responses in a frequency domain;
    shuffling the set of frequency responses with a predetermined shuffle scheme to develop a set of shuffled frequency responses;
    determining a set of phase differences as a difference between an angle of the frequency response and an angle of the shuffled frequency response at each element of the corresponding sets;
    quantizing each phase difference of the set to develop a set of secret-key quantized phases; and
    developing a set of spreading codes wherein each spreading code of the set includes a corresponding phase of the set of secret-key quantized phases.

14. The method of claim 13, further comprising, on each of the first communication device and the second communication device, modifying the set of frequency responses by eliminating at least some frequency responses of the set that are outside a predetermined passband prior to shuffling the set of frequency responses.

15. The method of claim 13, wherein:
  quantizing each phase difference of the set at the first communication device further comprises:
    determining a quantization error for each phase difference of the set; and
    transmitting the quantization error for each phase difference of the set to the second communication device; and
  quantizing each phase difference of the set at the second communication device further comprises:
    receiving the quantization error for each phase difference of the set from the first communication device; and
    applying the quantization error to each phase difference of the set prior to the quantizing.

16. The method of claim 13, wherein the set of frequency responses is identified as $C_{bb}(n)$, the set of shuffled frequency responses is identified as $C_{bb}(m1)$, and shuffling the set of frequency responses further comprises:
  shuffling the set of frequency responses with a first additional shuffle scheme to develop a first additional shuffled frequency response ($C_{bb}(m2)$); and
  shuffling the set of frequency responses with a second additional shuffle scheme to develop a second additional shuffled frequency response ($C_{bb}(m3)$); and
  wherein determining the set of phase differences comprises performing the operation, angle($C_{bb}(n)$)−angle($C_{bb}(m1)$)+angle($C_{bb}(m2)$)−angle($C_{bb}(m3)$),
    wherein "n" is an ordered index, and "m1," "m2," and "m3" are each distinct shuffled versions of "n".

17. The method of claim 13, further comprising at each of the first communication device and the second communication device removing a highest amplitude sample of the channel impulse response prior to the acts of converting the set of impulse responses to a set of frequency responses, shuffling the set of frequency responses, determining the set of phase differences, quantizing each phase difference, and developing the set of spreading codes.

18. The method of claim 17, wherein:
  quantizing each phase difference of the set at the first communication device further comprises:
    determining a quantization error for each phase difference of the set; and
    transmitting the quantization error for each phase difference of the set to the second communication device; and
  quantizing each phase difference of the set at the second communication device further comprises:
    receiving the quantization error for each phase difference of the set from the first communication device; and
    applying the quantization error to each phase difference of the set prior to the quantizing.

19. The method of claim 18, wherein the set of frequency responses is identified as $C_{bb}(n)$, the set of shuffled frequency responses is identified as $C_{bb}(m1)$, and shuffling the set of frequency responses further comprises:
  shuffling the set of frequency responses with a first additional shuffle scheme to develop a first additional shuffled frequency response ($C_{bb}(m2)$); and
  shuffling the set of frequency responses with a second additional shuffle scheme to develop a second additional shuffled frequency response ($C_{bb}(m3)$); and
  wherein determining the set of phase differences comprises performing the operation, angle($C_{bb}(n)$)−angle($C_{bb}(m1)$)+angle($C_{bb}(m2)$)−angle($C_{bb}(m3)$),
    wherein "n" is an ordered index, and "m1," "m2," and "m3" are each distinct shuffled versions of "n".

20. A communication device for communicating on a spread-spectrum, comprising:
  a receiver comprising circuitry for demodulating a plurality of beacon signals at a plurality of frequencies received from an additional communication device;
  a channel estimator comprising circuitry for determining a set of impulse responses from the received plurality of beacon signals; and
  a key generator comprising circuitry for:
    time-aligning the set of impulse responses to place a largest sample at a predefined position in the set of impulse responses;
    converting the set of impulse responses to a set of frequency responses in a frequency domain;
    developing a set of shuffled frequency responses by shuffling the set of frequency responses with a predetermined shuffle scheme;
    determining a set of phase differences, each phase difference of the set comprising a difference between an angle of the frequency response and an angle of the shuffled frequency response at each element of the corresponding sets;
    quantizing each phase difference of the set to develop a set of secret-key quantized phases; and developing a set of spreading codes wherein each spreading code of the set includes a corresponding phase of the set of secret-key quantized phases.

21. The communication device of claim 20, wherein the key generator further comprises circuitry for modifying the set of frequency responses by eliminating at least some frequency responses of the set that are outside a predetermined passband prior to shuffling the set of frequency responses.

22. The communication device of claim 20, wherein the key generator further comprises circuitry for determining a set of quantization errors for each phase difference of the set and further comprising a transmitter comprising circuitry for modulating the set of quantization errors onto a carrier frequency and transmitting the set of quantization errors to the additional communication device.

23. The communication device of claim 20, wherein:
the receiver further comprises circuitry for receiving a set of quantization errors from the additional communication device; and
the key generator further comprises circuitry for applying the set of quantization errors to the set of phase differences prior to the quantizing.

24. The communication device of claim 20, wherein the key generator further comprises circuitry for:
shuffling the set of frequency responses with a first additional shuffle scheme to develop a first additional shuffled frequency response ($C_{bb}(m2)$); and
shuffling the set of frequency responses with a second additional shuffle scheme to develop a second additional shuffled frequency response ($C_{bb}(m3)$); and
wherein the set of frequency responses is identified as $C_{bb}(n)$, the set of shuffled frequency responses is identified as $C_{bb}(m1)$ and determining the set of phase differences comprises performing the operation, angle($C_{bb}(n)$)−angle($C_{bb}(m1)$)+angle($C_{bb}(m2)$)−angle($C_{bb}(m3)$), wherein "n" is an ordered index, and "m1," "m2," and "m3" are each distinct shuffled versions of "n".

25. The communication device of claim 20, wherein the key generator further comprises circuitry for removing a highest amplitude sample of the channel impulse response prior to the acts of converting the set of impulse responses to a set of frequency responses, shuffling the set of frequency responses, determining the set of phase differences, quantizing each phase difference, and developing the set of spreading codes.

26. The communication device of claim 25, wherein:
the receiver is configured for receiving a set of quantization errors from the additional communication device;
the key generator further comprises circuitry for determining a set of quantization errors for each phase difference of the set: and
further comprising a transmitter comprising circuitry for modulating the set of quantization errors onto a carrier frequency and transmitting the set of quantization errors to the additional communication device.

27. The communication device of claim 26, wherein the key generator further comprises circuitry for:
shuffling the set of frequency responses with a first additional shuffle scheme to develop a first additional shuffled frequency response ($C_{bb}(m2)$); and
shuffling the set of frequency responses with a second additional shuffle scheme to develop a second additional shuffled frequency response ($C_{bb}(m3)$); and
wherein the set of frequency responses is identified as $C_{bb}(n)$, the set of shuffled frequency responses is identified as $C_{bb}(m1)$ and determining the set of phase differences comprises performing the operation, angle($C_{bb}(n)$)−angle($C_{bb}(m1)$)+angle($C_{bb}(m2)$)−angle($C_{bb}(m3)$), wherein "n" is an ordered index, and "m1," "m2," and "m3" are each distinct shuffled versions of "n".

28. The communication device of claim 20, wherein the communication device further comprises circuitry for periodically repeating the acts of time aligning, converting, shuffling, determining, quantizing, and developing to develop a new set of secret-key quantized phases.

29. The communication device of claim 20, further comprising a transmitter including circuitry for transmitting a spread-spectrum signal including an encoding of a data symbol using the set of spreading codes.

30. The communication device of claim 20, further comprising a transmitter including circuitry for transmitting a spread-spectrum signal on the plurality of frequencies, the spread-spectrum signal including an encoding of a data symbol at each frequency of the plurality using the set of spreading codes.

31. The communication device of claim 20, wherein the receiver further comprises circuitry for receiving a spread-spectrum signal and the communication device further comprises circuitry for decoding a data symbol by applying the set of spreading codes to the spread-spectrum signal.

32. The communication device of claim 20, wherein the receiver further comprises circuitry for receiving a spread-spectrum signal including a plurality of spectra, each spectrum of the plurality at a corresponding frequency of the plurality of frequencies and the communication device further comprises circuitry for decoding a data symbol at each frequency of the plurality using the set of spreading codes.

* * * * *